United States Patent
Wellons et al.

(10) Patent No.: US 7,440,567 B2
(45) Date of Patent: *Oct. 21, 2008

(54) HEALTHCARE VIRTUAL PRIVATE NETWORK METHODS AND SYSTEMS

(75) Inventors: David L. Wellons, Marietta, GA (US); Diane Brown Turcan, Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 416 days.

This patent is subject to a terminal disclaimer.

(21) Appl. No.: 10/353,126

(22) Filed: Jan. 27, 2003

(65) Prior Publication Data

US 2004/0146156 A1    Jul. 29, 2004

(51) Int. Cl.
*H04M 3/00* (2006.01)
*H04M 5/00* (2006.01)

(52) U.S. Cl. .............. 379/265.09; 379/265.01; 379/265.12

(58) Field of Classification Search .......... 379/219, 379/265.01–265.14, 220.01, 221.01; 705/1, 705/2, 3

See application file for complete search history.

(56) References Cited

U.S. PATENT DOCUMENTS

| | | | |
|---|---|---|---|
| 4,817,130 A | 3/1989 | Frimmel, Jr. | |
| 4,979,206 A | 12/1990 | Padden et al. | |
| 5,062,103 A | 10/1991 | Davidson et al. | |
| 5,062,133 A | 10/1991 | Melrose | |
| 5,113,429 A | 5/1992 | Morley, Jr. et al. | |
| 5,278,955 A | 1/1994 | Forte et al. | |
| 5,418,628 A | 5/1995 | Perkins | |
| 5,651,058 A | 7/1997 | Hackett-Jones et al. | |
| 5,678,179 A | 10/1997 | Turcotte et al. | |
| 5,711,297 A | 1/1998 | Iliff | |
| 5,748,100 A | 5/1998 | Gutman et al. | |
| 5,815,566 A | 9/1998 | Ramot et al. | |
| 5,822,418 A | 10/1998 | Yacenda et al. | |
| 5,841,854 A | 11/1998 | Schumacher et al. | |
| 5,867,821 A | 2/1999 | Ballantyne et al. | |
| 5,868,669 A | 2/1999 | Iliff | |
| 5,878,130 A | 3/1999 | Andrews et al. | |
| 5,917,893 A | 6/1999 | Katz | |
| 5,924,074 A * | 7/1999 | Evans ........................ 705/3 |
| 5,930,759 A | 7/1999 | Moore et al. | |
| 5,940,740 A | 8/1999 | Aas et al. | |
| 5,946,659 A | 8/1999 | Lancelot et al. | |

(Continued)

OTHER PUBLICATIONS

MediCall™ The Complete Call Center Solution for the Healthcare Industry, XTEND, 171 Madison Avenue, New York, NY 10016 212.951.7681, www.xtend.com.

(Continued)

*Primary Examiner*—William J Deane
(74) *Attorney, Agent, or Firm*—Scott P. Zimmerman, PLLC

(57) ABSTRACT

Methods and systems are disclosed for enabling a healthcare virtual private network (VPN) that leverages the assets of a shared, interconnected network of legacy systems. A data connection is established with a rule-based application dataserver of a telecommunications network facility to control access, sharing, notification, security, and/or management of electronic healthcare communications and/or data exchanged between or among a non-participant and a legacy system of a participant. Typically, the rule-based application dataserver is associated with a central office ("CO"), a mobile telephone switching center ("MTSO"), or a combination CO/MTSO. Methods and systems related to healthcare VPN billing are also disclosed.

22 Claims, 14 Drawing Sheets

U.S. PATENT DOCUMENTS

| | | |
|---|---|---|
| 5,951,645 A | 9/1999 | Goto |
| 5,963,864 A | 10/1999 | O'Neil |
| 6,006,206 A | 12/1999 | Smith et al. |
| 6,011,844 A | 1/2000 | Uppaluru et al. |
| 6,018,713 A | 1/2000 | Coli et al. |
| 6,035,021 A | 3/2000 | Katz |
| 6,052,442 A | 4/2000 | Cooper et al. |
| 6,075,787 A | 6/2000 | Bobeck et al. |
| 6,088,677 A | 7/2000 | Spurgeon |
| 6,112,183 A | 8/2000 | Swanson et al. |
| 6,119,108 A | 9/2000 | Holmes et al. |
| 6,122,485 A | 9/2000 | Archer |
| 6,137,524 A | 10/2000 | Chea |
| 6,137,876 A | 10/2000 | Wong et al. |
| 6,151,586 A | 11/2000 | Brown |
| 6,185,603 B1 | 2/2001 | Henderson et al. |
| 6,201,804 B1 | 3/2001 | Kikinis |
| 6,206,829 B1 | 3/2001 | Iliff |
| 6,229,888 B1 | 5/2001 | Miloslavsky |
| 6,282,565 B1 | 8/2001 | Shaw et al. |
| 6,295,551 B1 | 9/2001 | Roberts et al. |
| 6,305,007 B1* | 10/2001 | Mintz .............. 717/1 |
| 6,310,543 B1 | 10/2001 | Yoshioka et al. |
| 6,339,593 B1 | 1/2002 | Kikinis |
| 6,366,658 B1 | 4/2002 | Bjornberg et al. |
| 6,411,947 B1 | 6/2002 | Rice et al. |
| 6,434,121 B1 | 8/2002 | Davidson et al. |
| 6,445,784 B2 | 9/2002 | Uppaluru et al. |
| 6,456,594 B1 | 9/2002 | Kaplan et al. |
| 6,462,656 B2 | 10/2002 | Ulrich et al. |
| 6,473,404 B1 | 10/2002 | Kaplan et al. |
| 6,482,156 B2 | 11/2002 | Iliff |
| 6,501,562 B1 | 12/2002 | Nakagirl et al. |
| 6,721,412 B1 | 4/2004 | Youngs |
| 6,771,173 B1 | 8/2004 | Clayton et al. |
| 6,785,380 B2 | 8/2004 | Ribera |
| 6,810,429 B1* | 10/2004 | Walsh et al. ............. 709/246 |
| 6,859,649 B1 | 2/2005 | Denenberg et al. |
| 6,898,625 B2 | 5/2005 | Henry et al. |
| 6,970,548 B2 | 11/2005 | Pines et al. |
| 7,023,979 B1 | 4/2006 | Wu et al. |
| 7,167,553 B2 | 1/2007 | Shaffer et al. |
| 2002/0004727 A1* | 1/2002 | Knaus et al. |
| 2002/0010679 A1* | 1/2002 | Felsher |
| 2002/0016818 A1 | 2/2002 | Kirani et al. |
| 2002/0055917 A1* | 5/2002 | Muraca |
| 2002/0055987 A1 | 5/2002 | Coussement |
| 2002/0068575 A1 | 6/2002 | Agrawal et al. |
| 2002/0076026 A1 | 6/2002 | Batten |
| 2002/0080416 A1 | 6/2002 | Qulne |
| 2002/0106071 A1 | 8/2002 | Uppaluru et al. |
| 2002/0112008 A1 | 8/2002 | Christenson et al. |
| 2002/0114278 A1 | 8/2002 | Coussement |
| 2002/0120687 A1 | 8/2002 | Diacakis et al. |
| 2002/0143876 A1 | 10/2002 | Boyer et al. |
| 2002/0144154 A1 | 10/2002 | Tomkow |
| 2002/0163572 A1 | 11/2002 | Center, Jr. et al. |
| 2002/0167935 A1 | 11/2002 | Nabkel et al. |
| 2002/0188689 A1 | 12/2002 | Chung |
| 2003/0009530 A1 | 1/2003 | Phlonenko et al. |
| 2003/0028389 A1 | 2/2003 | Davis et al. |
| 2003/0055684 A1* | 3/2003 | Jaskolski et al. |
| 2003/0058838 A1 | 3/2003 | Wengrovitz |
| 2003/0065738 A1 | 4/2003 | Yang |
| 2003/0135565 A1 | 7/2003 | Estrada |
| 2003/0135624 A1 | 7/2003 | McKinnon et al. |
| 2003/0191665 A1* | 10/2003 | Fitzgerald et al. |
| 2003/0200226 A1 | 10/2003 | Wells et al. |
| 2003/0208543 A1 | 11/2003 | Enete et al. |
| 2004/0057869 A1 | 3/2004 | Busey et al. |
| 2004/0059803 A1 | 3/2004 | Brown, Jr. et al. |
| 2004/0117215 A1* | 6/2004 | Marchosky |
| 2004/0125938 A1 | 7/2004 | Turcan et al. |
| 2004/0193449 A1 | 9/2004 | Wildman et al. |
| 2004/0249776 A1 | 12/2004 | Horvitz et al. |
| 2005/0035862 A1 | 2/2005 | Wildman et al. |
| 2005/0065817 A1 | 3/2005 | Mihai et al. |
| 2005/0154792 A1 | 7/2005 | Derygin et al. |
| 2005/0209891 A1 | 9/2005 | Jacobus |

OTHER PUBLICATIONS

Paging Gateway A Wireless communications Solutions for Any Industry, XTEND, 171 Madison Avenue, New York, NY 10016 212. 951.7681, www.xtend.com.

XPress Desk™ The Complete Call Center Solution for the Hotel Industry, XTEND, 171 Madison Avenue, New York, NY 10016 212. 951.7681, www.xtend.com.

BellSouth Call Logix, BellSouth Corporation Headquarters, 1155 Peachtree St. NE, Atlanta, GA 30309-3610, www.bellsouth.com.

* cited by examiner

HEALTHCARE VIRTUAL PRIVATE NETWORK METHODS AND SYSTEMS

CROSS REFERENCE TO RELATED APPLICATIONS

This application relates to applicant' co-pending U.S. patent application Ser. No. 10/253,500 entitled "Network-Based Healthcare Information Systems," filed Sep. 24, 2002, and of which the "Brief Summary of the Invention" and "Detailed Description of the Invention" sections are incorporated herein by this reference.

This application also relates to applicant' co-pending U.S. patent application Ser. No. 10/335,453 entitled "Computer Telephony Integration (CTI) Complete Healthcare Contact Center," filed Dec. 31, 2002, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computer networks and to telephony. More particularly, this invention is directed to methods and systems for more efficient and effective communication of electronic healthcare data and communications within network-based systems and is also directed to related billing methods and systems.

2. Description of the Related Art

In *Epidemics*, Hippocrates wrote "[t]he art of medicine has three factors: the disease, the patient and the physician." Were he writing today, the Father of Medicine would also likely include "access to healthcare information" as a fourth factor. Why? Because today's healthcare marketplace is driven by increasing pressure for cost controls, by the increased strength of the consumer voice, by a shift from hospital inpatient care towards primary, ambulatory, and home care, by an emphasis on "case management," by increased competition, and by the focus on quality that is necessary for better patient care. This relentless drive to improve efficiencies and cut costs makes many traditional procedures inefficient. This relentless drive also presents great opportunities for healthcare professionals, organizations, patients, and others to enter into new types of multi-institution partnerships (e.g., strategic alliances between physician's offices, hospitals, clinics, labs, diagnostic centers, medical record repositories, insurers, patients, pharmaceutical and surgical suppliers, other vendors, etc.) that utilize many different computing systems and other communications technologies to manage and share electronic healthcare information. One of the biggest barriers facing these multi-institution partnerships is creating and maintaining a network-based system that manages efficient, effective, and secure access by participants and non-participants to standardized or otherwise compatible electronic healthcare information and communications (e.g., able to be presented over a variety of different software and hardware platforms).

Thousands, if not hundreds of thousands or more, of electronic documents, emails, and proprietary information are generated each day and shared among these multi-institution partnerships and non-participants. For example, a physician might order a complex lab test from the local hospital. Instead of waiting for the results to arrive by hand delivery, the physician's office may get online and request the test results via secure, encrypted email. The hospital's lab staff either manually attaches the lab result to a return email, or, in more advanced systems, the lab system responds automatically to the request and returns the results to a legacy system accessible by the physician. Another example is when a physician needs to admit a patient to the hospital. Instead of having the staff call the admission office and spend upwards of thirty (30) minutes talking and waiting on hold, the office sends the pre-admission information electronically, including patient record information and pre-admission orders to the hospital via an email attachment or directly to the hospital's legacy system. As used herein, the term "legacy system" or "legacy systems" includes data processing, storage, management, and information systems, communications devices, and other network components, such as, for example, databases of electronic patient health history, patient insurance information, demographic information, and physical records. Typically, each legacy system is customized in terms of software, hardware, and network configuration for each participant. Typically, each legacy system includes a network of multiple computer systems (e.g., personal computers, personal digital assistants, and other communications devices); however, the legacy system may also be a stand-alone computer system.

In the above examples, the shared healthcare information may be processed in a variety of ways. For example, the hospital may provide information to the physician by transmitting healthcare data over a Local Area Network (LAN) connection into a database on a web server. This healthcare information could then be transmitted to a computer system (e.g., personal computer or "PC") of the physician's legacy system over a data connection, such as the Internet, Intranet or Extranet, or over a direct connection, such as dial up access, using push technology that automatically broadcasts the data to the physician's computer system and allows the physician to view the transmitted healthcare data using an appropriate software package, such as a browser, or by using an applet. While one of the goals of a network-based data and communications exchange system is to translate and reformat data and/or communications from a non-participant's communications device to a legacy system so that it is compatible with the legacy system, thus far, similar systems have been primarily limited to very specialized healthcare information, limited in the features and services offered between non-participant communications devices and a linked legacy system, limited to managing only a small portion (if at all) of each legacy system involved in the exchange, limited to participants of the multi-institutional partnership, and limited in providing integrated, network-based security features.

In addition to the challenges of implementing a successful, integrated network-based system that enables the exchange of electronic healthcare information and communications, most of the participants and non-participants must also comply with a variety of federal, state, local and other rules that protect the privacy and security of healthcare information associated with a patient. For example, the Health Insurance Portability and Accountability Act (HIPAA), signed into law by President Clinton on Aug. 21, 1996 (Pub. L. 104-191, 110 Stat. 1936), covers health plans, healthcare clearinghouses, and healthcare providers who conduct certain financial and administrative transactions (e.g., electronic billing and funds transfers) electronically. Providers (e.g., physicians, hospitals, etc.) and health plans are required to give patients a clear written explanation of how a covered entity may use and disclose a patient's healthcare information. Further, healthcare providers are required to obtain patient consent before sharing information for treatment, payment, and healthcare operations. In addition, HIPPA also requires that a provider adopt and implement privacy procedures to ensure the privacy and security of the healthcare information.

The above discussion illustrates how the sharing of healthcare information (including communications) and technology among multiple participants and non-participants is creating a new foundation for a virtual healthcare setting. With this emerging virtual healthcare setting, what are needed are improved network-based healthcare systems and methods that integrate communications infrastructures of each participant to build a secure, integrated, network-based system accessible by participants and non-participants to support different organizational needs and capitalize on emerging trends in the healthcare setting. Accordingly, integrated, network-based healthcare systems and methods are needed that enable sharing, transferring, and/or accessing standardized or otherwise compatible data and communications with multiple legacy systems by participants and non-participants. Further, a need exists to improve notification, access, and management of the electronically shared healthcare information and communications without investing millions of dollars in computer equipment, in a networking infrastructure, in maintenance, and in training while also complying with security, authenticity, and/or privacy requirements. Still further, a need exists for related billing methods and systems for sharing, transferring, and accessing the electronic healthcare data and communications within the integrated, network-based system.

BRIEF SUMMARY OF THE INVENTION

The aforementioned problems and others are reduced by a healthcare virtual private network, (VPN) that provides systems and methods for more efficient and effective communication of electronic healthcare data and communications within network-based systems. The healthcare VPN leverages the assets of a telecommunications network, a data network, and/or other communications network of a legacy system associated with each participant in a multi-institutional partnership to facilitate improved access, sharing, notification, security, and/or management of electronic healthcare data and communications exchanged between or among different legacy systems and between or among different communications devices of non-participants. Some advantages of healthcare VPN include increased ability to flexibly manage and categorize electronic healthcare data and/or communications that are exchanged with other participants and non-participants and provide faster access to electronic healthcare data and/or communications. In addition, the healthcare VPN utilizes proprietary network-based systems (depending on how a non-participant accesses the healthcare VPN) to reduce or prevent electronic healthcare data and/or communications from entering traffic in a public data network, such as the Internet. If electronic healthcare data and/or communications are routed over the data network, then the healthcare VPN may utilize encryption and/or other secure technologies to protect and keep private the contents of the data and/or communication for routing over the data network.

An embodiment of this invention describes a method that includes receiving an electronic healthcare communication to a network-based communications system, interpreting the electronic healthcare communication according to a rule-based engine to categorize the electronic healthcare data, and processing the electronic healthcare communication within a legacy system according to the category selected by the rule-based engine. The network-based communications system enables an exchange of the electronic healthcare communication and selected data between one or more networks of communications devices of participants to a legacy system and of non-participants. Further, the network-based communications system is associated with a telecommunications service provider. In a preferred embodiment, a rule-based application dataserver is used to categorize the electronic healthcare communication. The rule-based application dataserver allows a customer (e.g., a participant) to control access, sharing, notification, security, and/or management of electronic healthcare communication (including electronic healthcare data) exchanged between or among different legacy systems and/or between or among a legacy system and a non-participant communications device. Typically, the rule-based application dataserver is associated with a central office ("CO"), a mobile telephone switching center ("MTSO"), or a combination CO/MTSO.

Another embodiment describes a method of storing electronic healthcare data (including communications) to a database associated with a rule-based application dataserver of a network-based communications system, the rule-based application dataserver controlling access to and from a legacy system of the network-based communications system and allowing a participant associated with the legacy system to manage a rule-based engine associated with the rule-based application dataserver. The rule-based engine provides rules to interpret the electronic healthcare data by associating (1) an access agent, (2) a security agent, (3) a messaging/communications agent, (4) a transactional agent, and/or (5) a troubleshooting agent with the electronic healthcare data. Similar to above, the network-based communications system enables an exchange of the electronic healthcare communication and selected data between one or more networks of communications devices of participants to a legacy system and of non-participants. Further, the network-based communications system is associated and/or otherwise connected with a telecommunications service provider.

Another embodiment describes a method for establishing a first data connection between a non-participant communications device and a network-based communications system, establishing a second data connection between a legacy system and a network-based communications system, and communicating electronic healthcare data via the first data connection and the second data connection. The second data connection uses a rule-based application dataserver similar to above and comprises rules for categorizing electronic healthcare data according to at least one of the following: (1) data associated with an access agent, (2) data associated with a security agent, (3) data associated a messaging/communications agent, (4) data associated with a transactional agent, and (5) data associated with a troubleshooting agent. The dataserver is hosted by a telecommunications service provider to control access to and from the legacy system.

Another embodiment describes a system that includes a network of legacy systems, each legacy system comprising software, hardware, and networks, each legacy system further comprising a plurality of interconnected communications devices serviced by a telecommunications service provider and a rule-based application dataserver for managing the exchange of electronic healthcare data between a non-affiliated legacy communications device and at least one legacy system, the rule-based application dataserver provided by the telecommunications service provider. In a further embodiment, the system includes an application program installed in a communications device affiliated with the legacy system. The application program allows a participant to remotely manage a rule-based engine associated with the rule-based application dataserver.

Another embodiment provides a method for billing for an electronic healthcare communication. The method includes (1) receiving information related to an originating address of an electronic healthcare communication to a network-based communications system, the electronic healthcare communication associated with at least one legacy system of a participant, (2) receiving information related to a termination address, the termination address determined by processing the electronic healthcare communication according to a category selected by a rule-based engine similar to the rule-based engine above, (3) transmitting the originating address information to a billing network element of the network-based communications system, (4) transmitting the termination address to the billing network element of the network-based communications system, (5) completing the electronic healthcare communication to the termination address, (6) transmitting the processing information to the billing network element of the network-based communications system, (7) transmitting a call record to a billing database, and (8) billing the participant for completing the electronic healthcare communication to the termination address. Typically, the call record contains information for the electronic healthcare communication that includes geographic information, minutes of use, routing means, call features, and troubleshooting information. The originating number may include a portable telephone number. Still another embodiment discloses a system for billing for an electronic healthcare communication that includes the means for implementing the above billing method.

BRIEF DESCRIPTION OF THE SEVERAL VIEWS OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
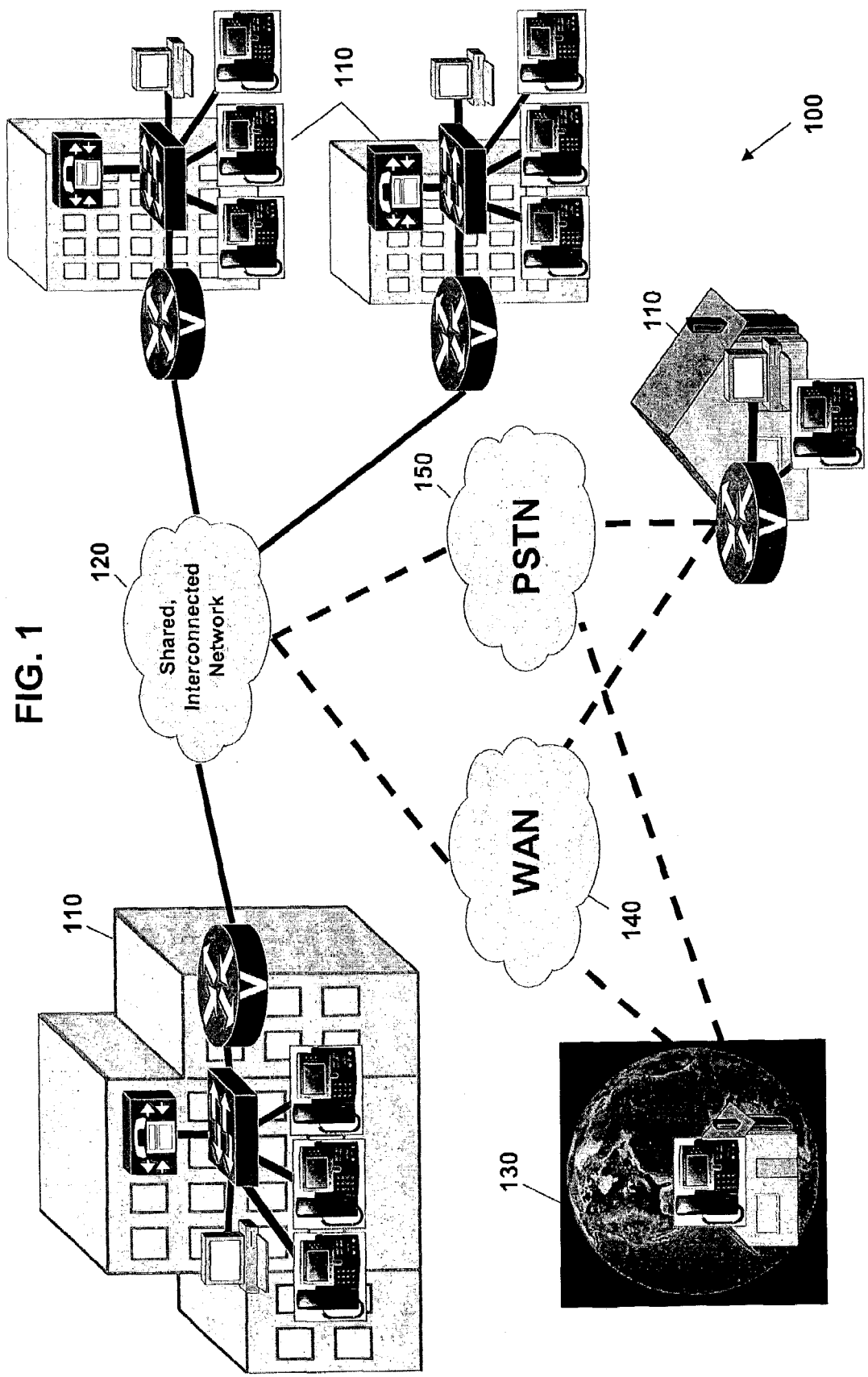
FIG. 1 is a schematic illustrating an overview of an exemplary operating environment of a healthcare virtual private network (VPN) according to an embodiment of this invention.

Referring now to FIG. 1, a healthcare virtual private network (VPN) 100 is typically a subject-specific group of related client, vendor, and service-oriented participants 110 of a multi-institutional partnership and of non-participants 130 that leverage the assets of a shared, interconnected communications network 120, a data network 140, and a telecommunications network 150. The purpose of the healthcare VPN 100 is to efficiently share information, automate business and transactional processes, and enhance market position. In the case of a healthcare VPN, participants 110 and non-participants 130 may include local hospitals, insurance companies, HMOs, affiliated hospitals, clinics, physician' offices, medical schools, universities, and strategic partners. Patients, as well as vendors, could also be included, as could service providers, such as clinical laboratories, pharmacy services, temporary agencies, private ambulance services, and subspecialty services. After all, rapid communication and exchange of information between these entities (e.g., participants and non-participants) can make a critical difference in the quality of patient care. In most cases, each participant 110 usually has its own legacy system, including software, hardware, equipment, networks, and/or other information technology assets. For example, a hospital commonly has a local and/or a wide area network that utilizes Ethernet, dedicated private lines, Frame Relay, ISDN, ATM, ADSL, and the like. Further, these legacy systems provide an interface to a data network, such as the Internet, Intranet, and/or Extranet, that may be locally or remotely accessed by a participant's user (e.g., a hospital employee using a computer system within the hospital's legacy system).

This invention provides improved access, sharing, notification, routing, security, and/or management of electronic healthcare communications and/or data exchanged between or among a non-participant 130 and one or more legacy systems associated with a participant 110 of the shared, interconnected network 120. As discussed in more detail below, the shared, interconnected network 120 uses a rule-based application dataserver, preferably provided by a telecommunications service provider, and also uses an integrated delivery system (IDS) to process exchanged information into a selected legacy system. As used herein, the term "electronic healthcare communication" includes audio, video, text, and/or digital communications including electronic healthcare communications such as email, attached files (e.g., an attached file to the email), and compatible second data formats (e.g., an attached file that has been processed by the rule-based application dataserver and the IDS to format and/or standardize electronic information shared between a first and a second legacy system). The term "electronic healthcare communication" also includes transaction notifications and/or transaction replies generated by the rule-based application dataserver and/or the IDS, and/or other means of communicating electronic information between or among healthcare VPN entities.

Figure 2:
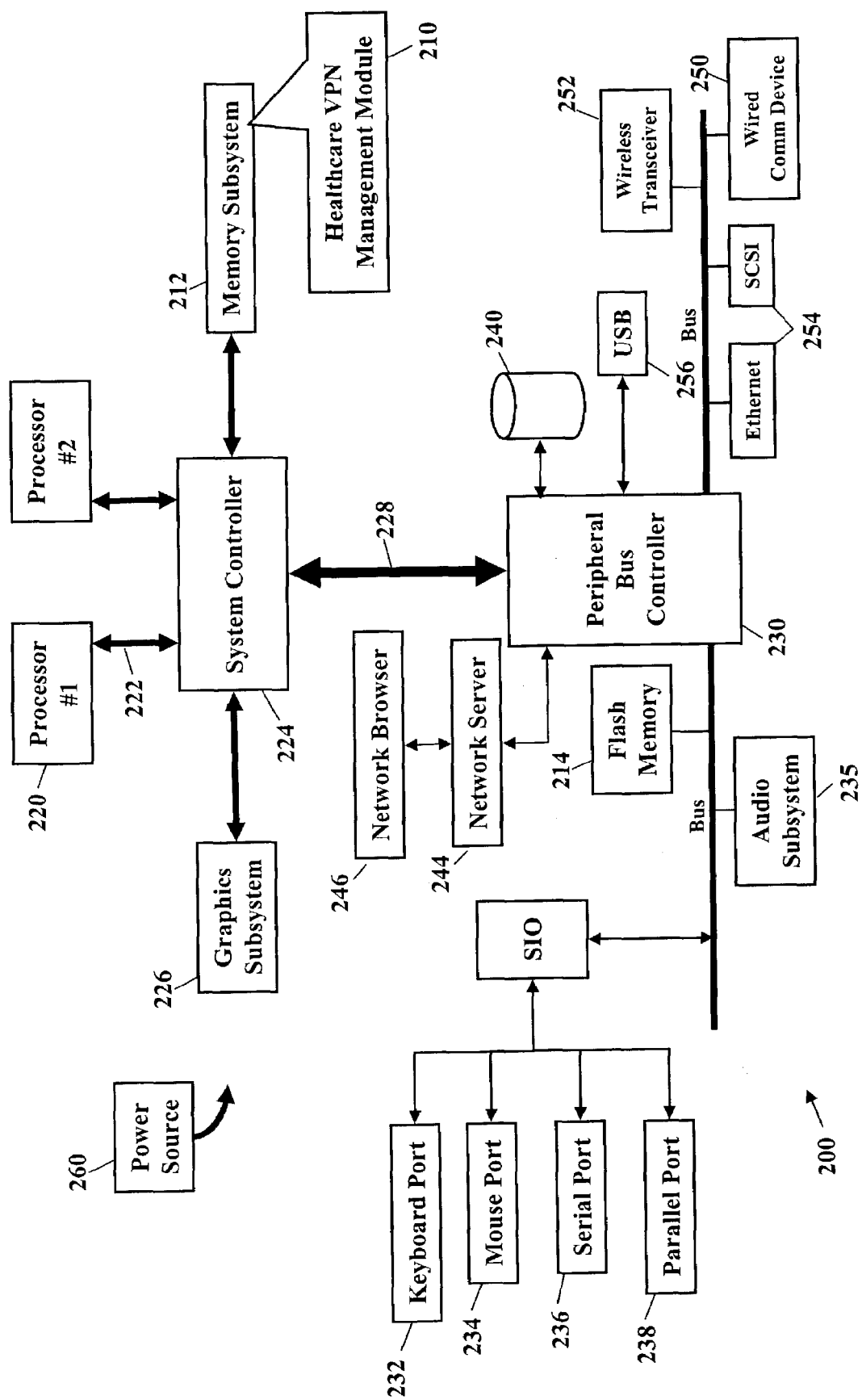
FIG. 2 is a block diagram showing of a Healthcare VPN Management Module that resides in a computer system according to an embodiment of this invention.

FIG. 2 is a block diagram showing a VPN Management Module 210 residing in a computer system 200. The VPN Management Module 210 operates within a system memory device. The VPN Management Module 210, for example, is shown residing in a memory subsystem 212. The VPN Management Module 210, however, could also reside in flash memory 214 and/or in a peripheral storage device, such as storage device 240. The computer system 200 also has one or more central processors 220 executing an operating system. The operating system, as is well known, has a set of instructions that control the internal functions of the computer system 200. A system bus 222 communicates signals, such as data signals, control signals, and address signals, between the central processors 220 and a system controller 224 (typically called a "Northbridge"). The system controller 224 provides a bridging function between the one or more central processors 220, a graphics subsystem 226, the memory subsystem 212, and a PCI (Peripheral Controller Interface) bus 228. The PCI bus 228 is controlled by a Peripheral Bus Controller 230. The Peripheral Bus Controller 230 (typically called a "Southbridge") is an integrated circuit that serves as an input/output hub for various peripheral ports. These peripheral ports could include, for example, a keyboard port 232, a mouse port 234, a serial port 236 and/or a parallel port 238. Additionally, these peripheral ports would allow the computer system 200 to communicate with a variety of communications devices through ports (such as a SCSI port and/or an Ethernet port, shown as reference numeral 254), a Wireless Transceiver port 252 (using the IEEE Wireless standard 802.11, Infrared, the Industrial and Scientific band of the electromagnetic spectrum, or any other portion of that same spectrum), and a Wired Comm Device Port 250 (such as modem V90+ and compact flash slots). The Peripheral Bus Controller 230 could also include an audio subsystem 235. Additionally, the computer system 200 may interface with a network server 244 operating with a network browser 246. The network server 244 and the network browser 246 may be stand alone or integrated components. Still further, the computer system 200 may include a power source 260, such as a rechargeable battery to provide power and allow the computer system 200 to be portable. The power source 260 may additionally or alternatively include an alternating current (AC) power source or power converter.

The processor 220 is typically a microprocessor. Advanced Micro Devices, Inc., for example, manufactures a full line of microprocessors, such as the ATHLON™(ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C. 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com), and Mac® OS (Mac® is a registered trademark of Apple Computer, Inc., 1 Infinite Loop, Cupertino, Calif. 95014, 408.996.1010, www.apple.com).

The system memory device (shown as memory subsystem 212, flash memory 214, or peripheral storage device 240) may also contain one or more application programs. For example, an application program may cooperate with the operating system and with a video display unit (via the serial port 236 and/or the parallel port 238) to provide a Graphical User Interface (GUI) display for the VPN Management Module 210. The GUI typically includes a combination of signals communicated along the keyboard port 232 and the mouse port 234. The GUI provides a convenient visual and/or audible interface with the user of the computer system 200. As is apparent to those of ordinary skill in the art, the selection and arrangement of the VPN Management Module 210 may be programmed over a variety of alternate mediums, such as, for example, a voice-activated menu prompt.

The VPN Management Module 210 allows a participant 110 to manage VPN Management services, such as: (1) allowing a user (e.g., an authorized staff member associated with the participant's legacy system) to customize rules and user groups associated with a rule-based engine of the rule-based dataserver including an access agent, a security agent, a messaging/communications agent, a transaction agent, and a troubleshooting agent; (2) allowing the user to customize presentation, features, and/or management of an incoming electronic healthcare communication (e.g., an email, an attached file, a compatible second data format, a transaction reply, a transaction notification, and/or other electronic communications); and (3) allowing the user to control the shared, interconnected network, the telecommunications network, and/or a data network connection with his/her legacy system. For example, the user may select an Access Agent having a user group list to add, delete, or modify participant information, such as, associated service node addresses, IP addresses, email addresses, and/or other electronic address information of communications devices associated with the healthcare VPN. For example, an address of the user group list may be associated with the electronic healthcare communication and act as a trigger (similar to decoding an ICLID signal for telecommunication special service features offered by telecommunication service providers) to send the electronic healthcare communication to the VPN rule-based application dataserver (such as Healthcare VPN Rule-Based Application DataServer 448 of FIG. 4). The VPN Management Module 210 also allows the user to customize features, such as electronic healthcare communication handling options. For example, the VPN Management Module 210 may split a user's screen into two viewing areas and present the incoming electronic healthcare communication in one portion and present information associated with an attached file and/or a compatible second data format that has been or that might be integrated into the user's legacy system. Further, the VPN Management Module 210 may allow the user to control whether to accept, decline, or postpone integration of the compatible second data format into the legacy system or might be set to automatically accept, decline, or postpone integration depending on a participant's address or on an address of the non-participant's communications device. Still further, the VPN Management Module 210 of the computer system 200 may provide the IP address or the like so that the shared interconnected network, the telecommunications network, and/or the data network can communicate the electronic healthcare communication, and, thus integrate telephony events and data network events with the legacy system and/or the non-participant's communications device. Finally, the VPN Management Module 210 may interact and/or otherwise interface with a telecommunications network-based information systems (NBIS) management module that controls access, sharing, notification, security, and/or management of electronic healthcare data exchanged between or among different legacy systems of participants. The NBIS Management Module and related methods and systems are disclosed in applicants' co-pending U.S. patent application Ser. No. 10/253,500 entitled "Network-Based Healthcare Information Systems," filed Sep. 24, 2002, and of which the "Brief Summary of the Invention" and "Detailed Description of the Invention" sections are incorporated herein by this reference.

In an embodiment, the VPN Management Module 210 also allows the participant 110 to control access, sharing, notification, routing, security, management, and/or additional processing of electronic healthcare communications and associated data between or among a legacy system (including communications devices of a staff member associated with the participant) and a non-participant's communications device. For example, the VPN Management Module 210 allows the participant (via an authorized user/staff member) 110 to control how the data (i.e., the electronic healthcare communication and/or associated data) is processed into the legacy system (such as legacy system 302 in FIG. 3) including (1) sending the data to a local storage device (such as data center 312 shown in FIG. 3), or alternatively, to a remote storage device (such as a file server associated with a the telecommunications service provider, for example, e-center 314 of FIG. 3), (2) archiving the data, (3) encrypting the data, (4) copying the data, and (5) associating the data with a healthcare VPN rule-based profile (such as healthcare VPN rule-based profile 500 of FIG. 5). The VPN Management Module 210 may be downloaded from a telecommunications network, a data network, or provided on a storage media (e.g., diskette, CD-ROM, or installed by the computer system manufacturer) to install on the computer system 200 to enable, disable, and further control a variety of healthcare VPN services. Still further, the VPN Management Module 210 allows the user to customize presentation features, such as splitting a workstation screen into two viewing areas and presenting a video display of the electronic healthcare communication in one portion and presenting information associated with the Access Agent (e.g., staff directory) in the second portion.

Figure 5:
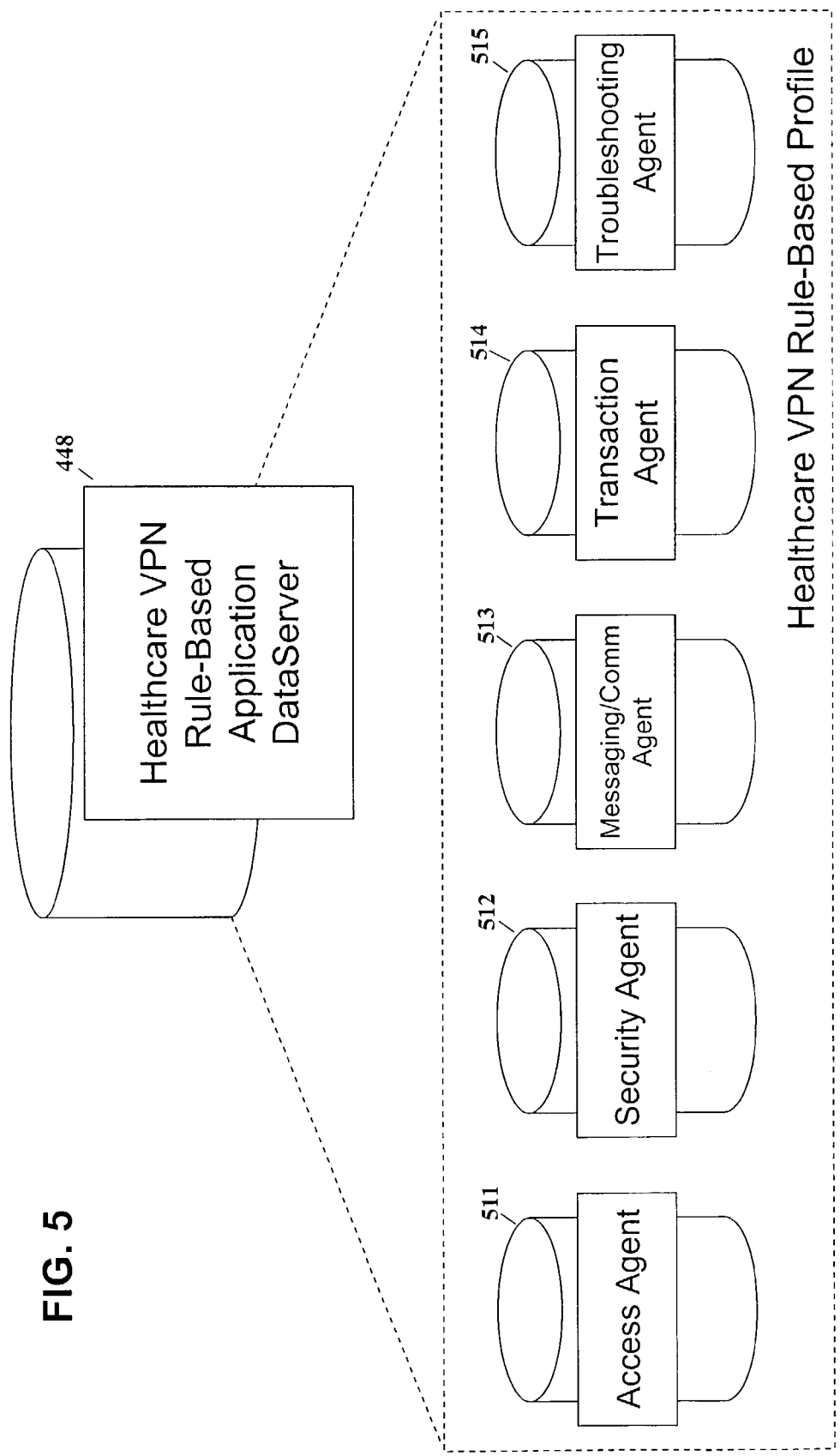
FIG. 5 is a more detailed schematic of the healthcare VPN rule-based application dataserver shown in FIG. 4.
Figure 6:
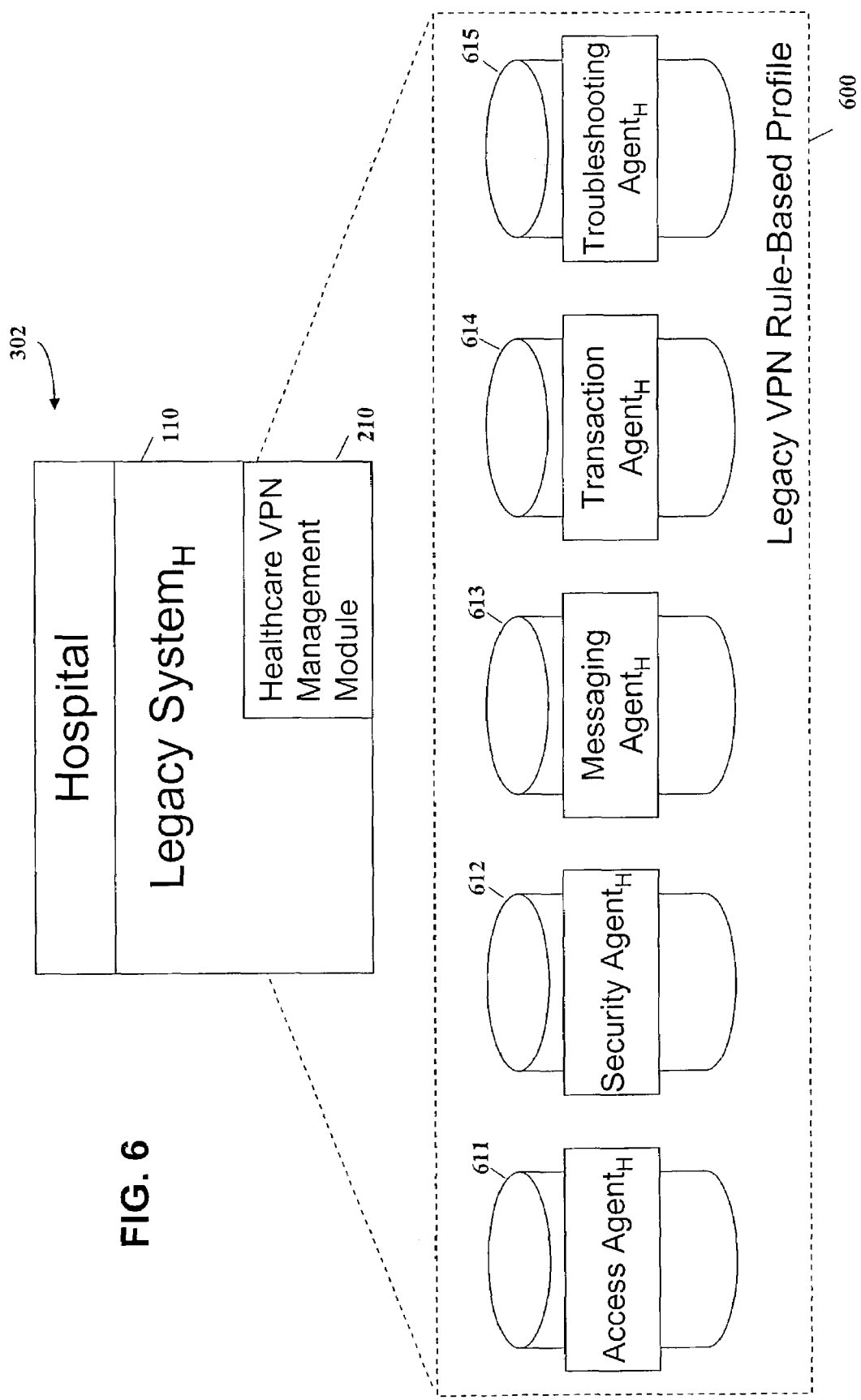
FIG. 6 is a more detailed schematic of a healthcare VPN rule-based profile residing in the hospital's legacy system shown in FIG. 1.
Figure 7:
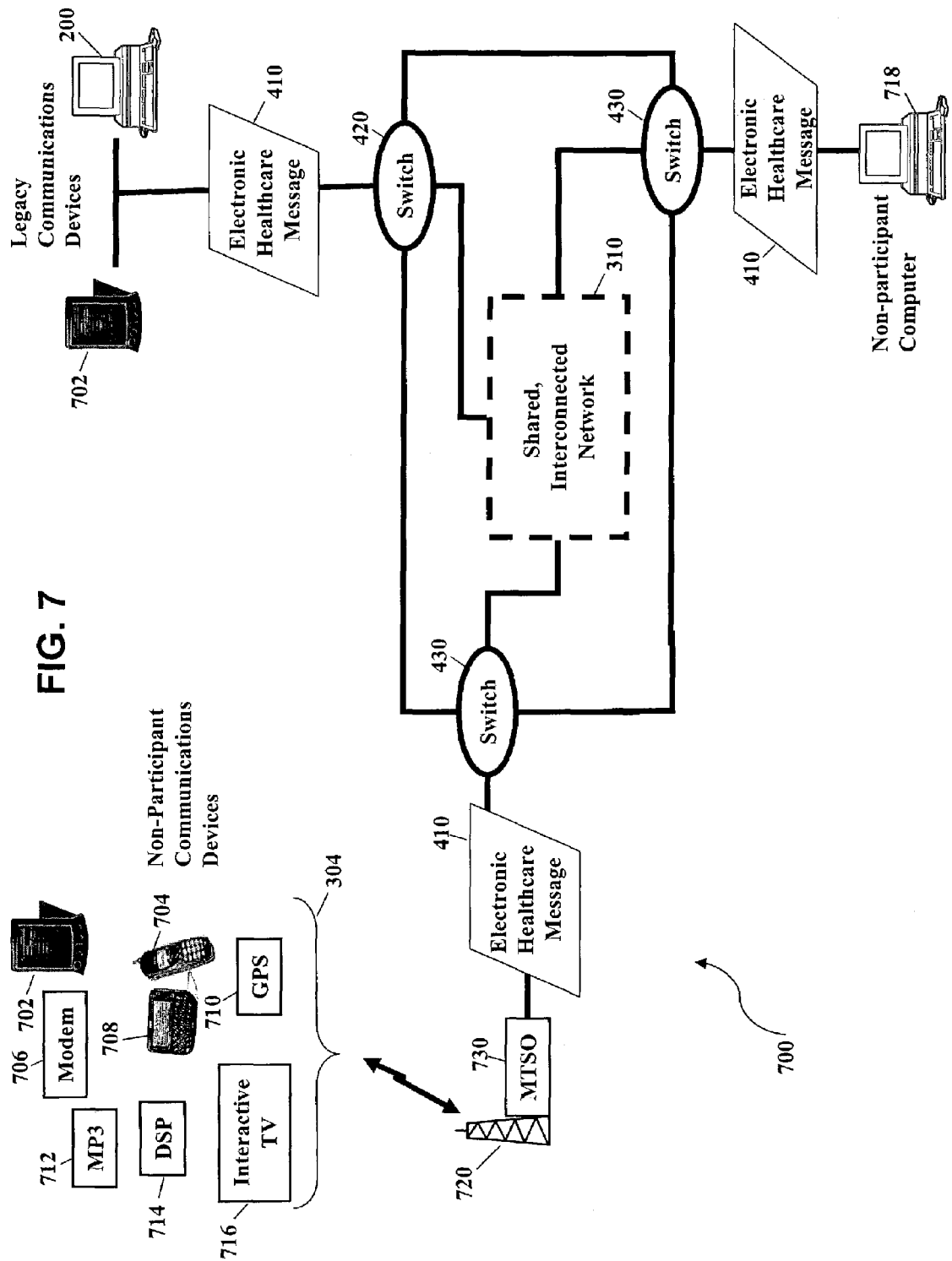
FIG. 7 is a schematic showing an exemplary embodiment of communicating an electronic healthcare communication using wired and wireless communications devices associated with the healthcare VPN according to an embodiment of this invention.
Figure 8:
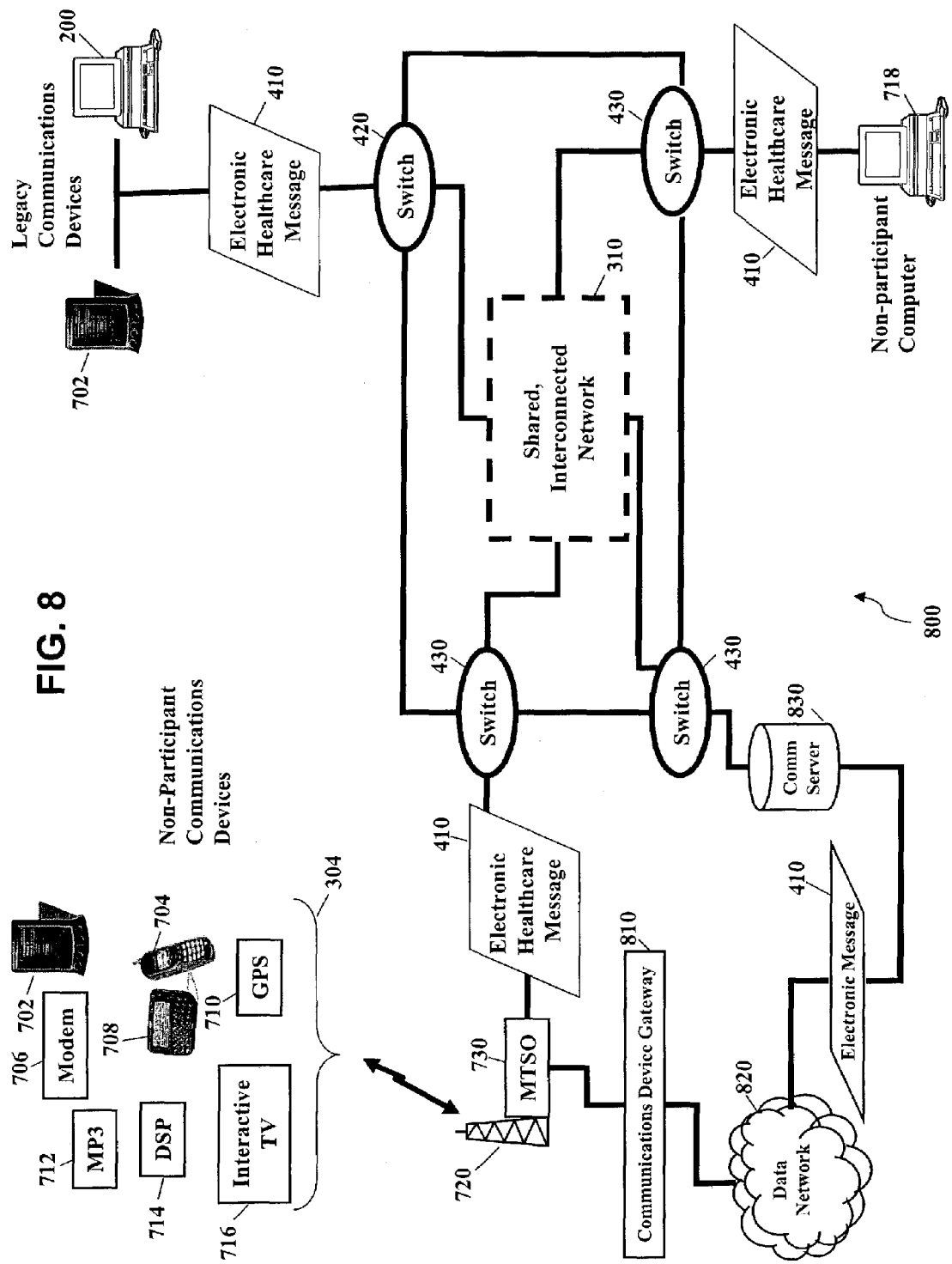
FIG. 8 is a schematic showing another exemplary embodiment of communicating an electronic healthcare communication using wired and wireless communications devices associated with the healthcare VPN according to an embodiment of this invention.

Referring to FIGS. 3-11, the healthcare VPN 300 includes at least one legacy system 302 of a participant (e.g., an affiliated hospital, a participant's physician office, etc., generally shown as reference numeral 110 in FIG. 1), at least one communications device (and/or information system) 304 of a non-participant (e.g., non-participant physician office, generally shown as reference numeral 130 in FIG.1), a shared, interconnected network 310, a central office 311 of the shared, interconnected network 310, a data center 312, an interactive multimedia enabled contact center 313, an electronic center ("e-center") 314, fast packet portal means 315, switched network portal 316, a data network 318, a central office 320 associated with the non-participant's communications device 304, and a billing system 330. Communications device 304 is generically shown in FIG. 3; however, exemplary communications devices are shown in FIGS. 7-8 including personal digital assistant (PDA) 702, wireless phone 704, modem 706, interactive pager 708, global positioning system (GPS) 710, MP3 712, digital signal processor 714, interactive television 716, and computer system 718. Each legacy system 302 includes at least one of the computer system (shown as reference numeral 200 in FIG. 2) and may have the VPN Management Module 210 (including the IP address or other communications address associated with a participant's telecommunications network, data network connection, and/or shared, interconnected network) residing within the computer system. Each legacy system 302 may also include other communications devices such as on-site pager 990, personal digital assistant (PDA) 992, interactive pager 994, wireless phone 996, MP3 1102, digital signal processor 1104, modem 1106, global positioning system (GPS) 1108, and interactive television 1110 of FIGS. 9-11). The legacy system 302 may further include an Internet Service Provider (e.g., America On-Line) 460, the data network 318, a gateway 470, an Integrated Delivery System (IDS) 450, and external data sources 312 (also referred to herein as the "data center"). The central office 311 of the telecommunications network 150 typically includes a service switching point (SSP) 442, a service control point (SCP) 444, an Intranet 446, and a healthcare VPN Rule-Based Application Dataserver 448. Switch 420 allows the connected legacy systems 302 to communicate electronic healthcare communications 410 via the telecommunications network facility 440. Similarly, each switch 430 allows the connected communications device 304 of a non-participant to communicate electronic healthcare communications 410 via the telecommunications network facility 440. The telecommunications network facility 440 may include the central office (CO) 311, a mobile telephone switching office (MTSO) (not shown), and/or a combination CO/MTSO. Further, the telecommunications network facility 440 may use any means of coupling switches 420, 430 to the telecommunications network facility 440, but the coupling means is preferably high-capacity, high-bandwidth optical transport services, Gigabit Ethernet services, and/or the like for digital electronic healthcare communications, such as fast packet portal means 315. Other coupling means includes switch network portal means 316 typically used for voice and data transmissions. As those of ordinary skill in the art of telecommunications understand, the telecommunications network facility 440 could also link switches 420 of the legacy system (or the communications device of the non-participant) via other appropriate means, such as, for example a Synchronous Optical Network (SONET) structure with redundant, multiple rings.

Typically, a non-participant 130 uses communications device 304 to gain access to the shared, interconnected network 310, the WAN 140, and/or PSTN 150 (shared, interconnected network 310, WAN 140, and PSTN 150 are shown in FIG. 1). For example, if a non-participant wishes to send, receive, or access voice, video, and/or data (e.g., read and respond to e-mail, order test results, view video-clips including static images, listen to recorded information, engage in an interactive-diagnosis session, etc.), then the communications device 304 connects with the interconnected network 310 via switch 430. Communications signals associated with the address of the electronic healthcare communication 410 arrive at SSP 442, and the SSP 442 analyzes the signals and determines whether the electronic healthcare communication 410 is addressed to a healthcare participant 110 or a non-participant 130. Depending on the address and content of the electronic healthcare communication (e.g., whether or not the electronic healthcare communication is to a non-participant, whether or not a file is attached, etc.), the SSP 442 may route the electronic healthcare communication 410 immediately over the telecommunications network facility 440 to attempt a connection with legacy system 110 (and/or data center 312 and/or e-center 314) or the SSP may communicate with SCP 444 for further electronic healthcare communication processing and routing information (including eventual routing to the VPN Rule-Based Application DataServer 448 if the electronic healthcare communication 410 is to or from a participant 110). The healthcare VPN 300 may include wired, optical, and/or wireless elements and may further include private network elements, such as private branch exchanges (PBXs), and/or other elements (not shown). The telecommunications network facility 440 includes Advanced Intelligent Network (AIN) componentry controlling many features of the network. The telecommunications network facility 440 or switches 420, 430 could also include a packet-based "soft switch" that uses software control to provide voice, video, and/or data services by dynamically changing its connection data rates and protocols types. If the telecommunications network facility 440 or switches 420, 430 should include a softswitch, the AIN componentry is replaced by an application server that interfaces with the softswitch via a packet protocol, such as Session Initiation Protocol (SIP). The signaling between the computer system 200, the legacy system 302, the communications device 304, the switches 420, 430, the telecommunications network facility 440 including AIN componentry, the data network 318, and the e-center 314, however, are well understood in by those of ordinary skill the art and will not be further described. Further, those of ordinary skill in the art will be able to apply the principles of this invention to their own information and computing systems including their network configurations which may differ substantially from the system shown in the figures.

The VPN Rule-Based Application DataServer 448 communicates with SCP 444 and Intranet 446 to effectively provide VPN Management Services. These VPN Management Services allow the participant 110 to control access, sharing, notification, routing, security, transactions, troubleshooting, management, and/or additional processing of electronic healthcare communications exchanged to/from other participants. For example, VPN Management Services allows the participant to control how the electronic healthcare communication is processed into the receiver legacy system including (1) sending the electronic healthcare communication to a storage device associated with the telecommunications service provider, such as storage at e-center 315 (2) archiving the electronic healthcare communication, (3) encrypting the electronic healthcare communication, (4) copying the electronic healthcare communication, and (5) associating the electronic healthcare communication with related data in one or more legacy systems. Further, the VPN Management Services may be activated, de-activated, administered, and/or otherwise managed by the participant 110 or another entity with authorization (e.g., telecommunications service provider). In an embodiment, the Healthcare VPN Rule-Based Application DataServer 448 has the ability to communicate with various networks, including internal and external telecommunications and/or data networks (and the shared, interconnected network) using appropriate protocols, such as standard transmission control protocol and Internet protocol (TCP/IP). The healthcare VPN rule-based profiles stored by the Healthcare VPN Rule-Based Application DataServer 448 provide increased security by allowing each participant 110 to control electronic healthcare data, utilize existing databases to add, delete, or otherwise change electronic healthcare data, and control how their legacy system interacts with non-proprietary networks and non-participant communications devices, such as controlling routing instructions. Thus, the Healthcare VPN Rule-Based Application DataServer 448 and associated systems may function as a computer server, database, and processor and is dedicated to managing healthcare VPN activity over the participant's proprietary and non-proprietary networks.

The VPN Management Module 210, may be downloaded from ISP 260, VPN Rule-Based Application DataServer 448, Intranet 446, or provided on a storage media (e.g., diskette, CD-ROM, or installed by the computer system manufacturer) to the participant 110 to install on the computer system 200 to enable, disable, and further control a variety of the VPN Management Services. Additionally, the non-participant 130 is typically provided an applet and/or a web browser interface for communicating the electronic healthcare communication over the healthcare VPN. The applet and/or web-browser operates over the non-participant's communication device 304 to allow the non-participant to control a limited set of commands for VPN Management Services including verification and authentication requirements.

Figure 4:
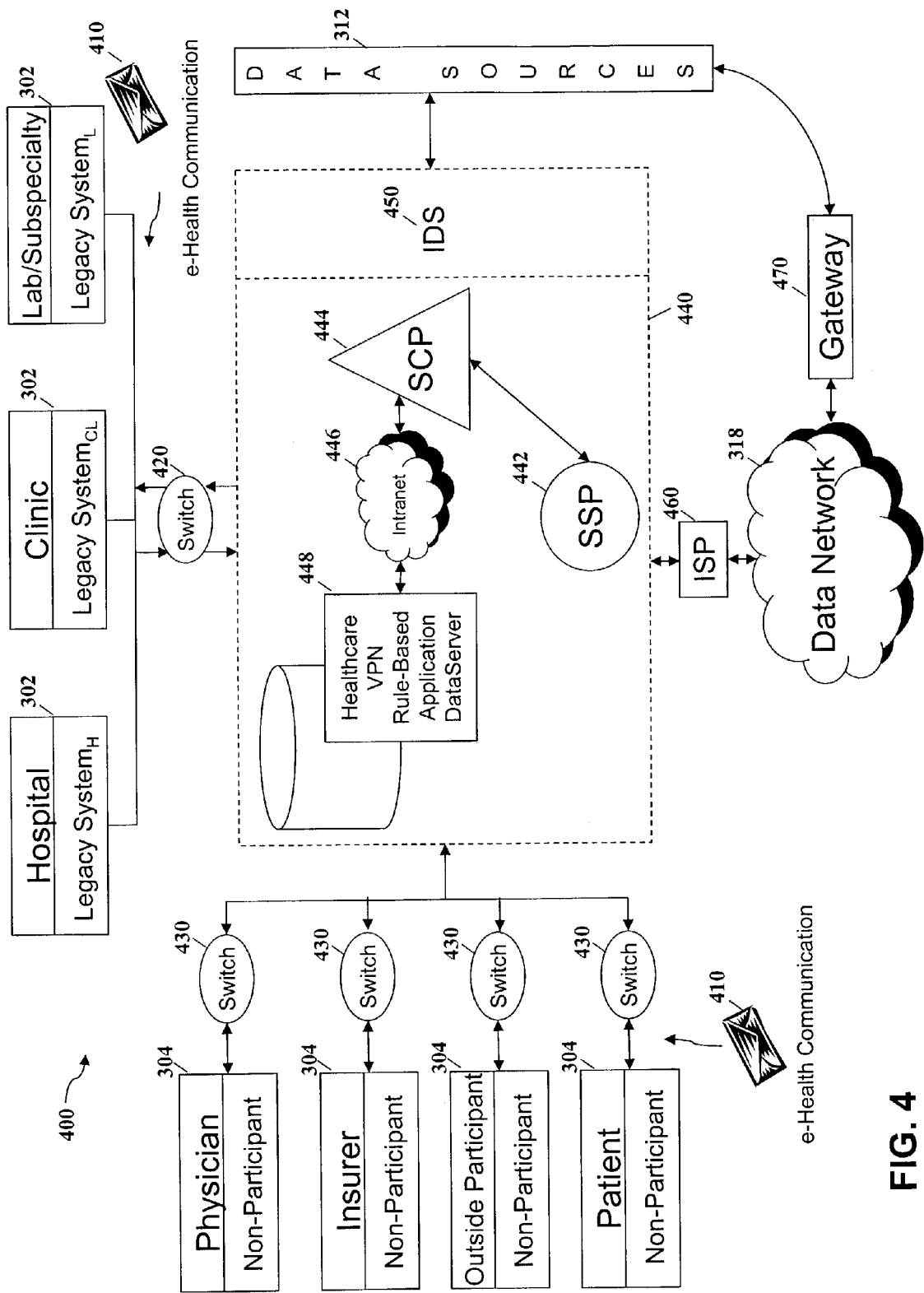
FIG. 4 is a schematic showing a detailed schematic of another operative environment for a healthcare VPN system according to an embodiment of this invention.

As illustrated by FIG. 4, the flow of the electronic healthcare communication 410 may involve the non-participant 130 using communications device 304 to create the electronic healthcare communication 410 with or without an attached file and/or associated data. Alternatively, the flow of the electronic healthcare communication 410 may involve the participant 110 using the computer system 200 to create the electronic healthcare communication 410 with an attached file. The non-participant 130 and/or participant 110 may create the electronic healthcare communication 410 using a variety of software applications including electronic messaging, word processing, and others (e.g., MICROSOFT OUTLOOK® and MICROSOFT WORD® are registered trademarks of Microsoft Corporation, One Microsoft Way, Redmond Wash. 98052-6399, 425.882.8080, www.Microsoft.com). Alternatively, the electronic healthcare communication 410 may be created using the applet, web browser, and/or VPN Management Module 210 that includes instructions to/for the IDS 450. The electronic healthcare communication 410 is routed and received in the telecommunications network facility 440. In an embodiment, the VPN Rule-Based DataServer 448 determines whether external data sources 312 need to be queried for related electronic healthcare data or for retrieving a file that is linked rather than attached to the electronic healthcare communication 410. Next, the telecommunications network facility 440 interprets the electronic healthcare communication 410 including any attached files, related healthcare data, and/or the linked files using network elements including the VPN Rule-Based Application DataServer 448. Thereafter, the VPN Rule-Based Application DataServer 448 routes the electronic healthcare communication (e.g., the attached file, related healthcare data, and/or the linked object) 410 to the IDS 450 so that the electronic healthcare communication 410 may be interpreted from the non-participant's communications device for compatible exchange with the participant's legacy system (i.e., from the non-participant insurer communications device to the physician's legacy system). The IDS 450 may be a stand alone system (not shown in the figures), the IDS 450 may be integrated into the telecommunications network facility 440 (as shown in FIG. 4), the IDS 450 may be integrated with one of the participant's legacy systems (not shown in the figures) that is accessed by the telecommunications network facility 440 or data network 318, or the IDS 450 may be a combination of these systems (not shown). No matter how the IDS 450 is deployed, the electronic healthcare communication 410 and/or data is received, processed so that the electronic healthcare communication 410 and/or data are compatible for the receiving legacy system 110, and associated with a transaction reply (e.g., a communication to the receiving participant about the electronic healthcare communication 410 including information about the attached file or the compatible second data format) or with a transaction notification (e.g., a communication to the non-participant's communications device about the electronic healthcare communication 410 including information about the attached file or the compatible second data format). Thereafter, the transaction reply and/or the transaction notification are routed through the telecommunications network facility 440 and forwarded to the receiving legacy system or to the non-participant's communications device (not shown). The VPN Management Module 210 presents the electronic healthcare communication 410 so that the receiving participant 110 of the computer system 200 has immediate access, notification, and management of the electronic healthcare communication 410 including the compatible second data format and updated data in the receiving legacy system 110.

Referring now to FIG. 5, the participant 110 interacts with the VPN Management Module 210 and with Intranet 446 to access and login to the VPN Rule-Based Application DataServer 448 and to establish a VPN Rule-Based Profile 500. The VPN Rule-Based Application DataServer 448 stores one or more VPN Rule-Based Profiles 500 that include data and applications associated with an Access Agent 511, a Security Agent 512, a Messaging/Communications agent 513, a Transaction Agent 514, and a Troubleshooting Agent 515. For example, the Access Agent 511, Security Agent 512, Messaging/Communications Agent 313, Transaction Agent 514, and Troubleshooting Agent 515 may contain a variety of fields and/or files associated with at least one of the following: login information associated with a user (including participants 110, non-participants 130, and/or authorized users), password of the user, telephone number or Service Node of the user (this may include a plurality of addresses that are associated with a Service Node or other switch, such as, for example, switch 420 serving the legacy systems 110), TCP/IP address of the user, profile of the computer system 200 or other communications device associated with the incoming electronic healthcare communication (e.g., presentation formats for various communications devices), a time or date identifier (e.g., day of week or calendar date), other information associated with the electronic healthcare communications signal, size and content of electronic healthcare communication (including types of files that are transmitted as an attached file), transaction reply(s), transaction notification(s), display of a GUI (e.g., color, font, placement of VPN Management Module 210 on screen, etc.), VPN Management Service defaults (e.g., whether the IDS automatically re-formats the attached file to a compatible second data format and updates the legacy system with the compatible second data format), and other selections related to VPN Management Services, such as electronic healthcare communication features, electronic healthcare communication routing, and troubleshooting problems or error messages.

FIG. 6 illustrates an embodiment of establishing a legacy VPN Rule-Based Profile 600 to interact with the healthcare VPN Rule-Based Profile 500 of the interconnected network 210. The VPN Management Module 210 of computer system 200 is used to establish, store, and manage the legacy VPN Rule-Based Profile 600 for legacy system 110 (i.e., the hospital's legacy system). The legacy system 110 stores one or more VPN Rule-Based Profiles 600 that include data and applications similar to healthcare VPN Rule-Based Profile 500. The legacy VPN Rule-Based Profiles 600; however, provide increased security by allowing the participant 110 to internally control electronic healthcare data and/or communications, utilize existing databases to add, delete, or otherwise change electronic healthcare data and/or communications, control how the participant's legacy system interacts with the IDS, and control routing instructions within its legacy system 110.

FIGS. 7-8 are schematics showing a variety of wired and wireless communications devices 304 communicating the electronic healthcare communication 410 through the shared, interconnected network 310 according to alternate embodiments of this invention. The means of coupling the computer system 200 or other communications device (shown as reference numeral 702) to the switch 220 (and similarly of coupling non-participant communications devices 702-718) include a variety of means, including optical transmission of electronic healthcare data, wireless transmission of electronic healthcare data, and/or fixed-wire transmission of electronic healthcare data (e.g., via a local loop of a telecommunications network to communicate electronic healthcare data). Fiber optic technologies, spectrum multiplexing (such as Dense Wave Division Multiplexing), Ethernet and Gigabit Ethernet services, and Digital Subscriber Lines (DSL) are just some examples of the coupling means.

Figure 3:
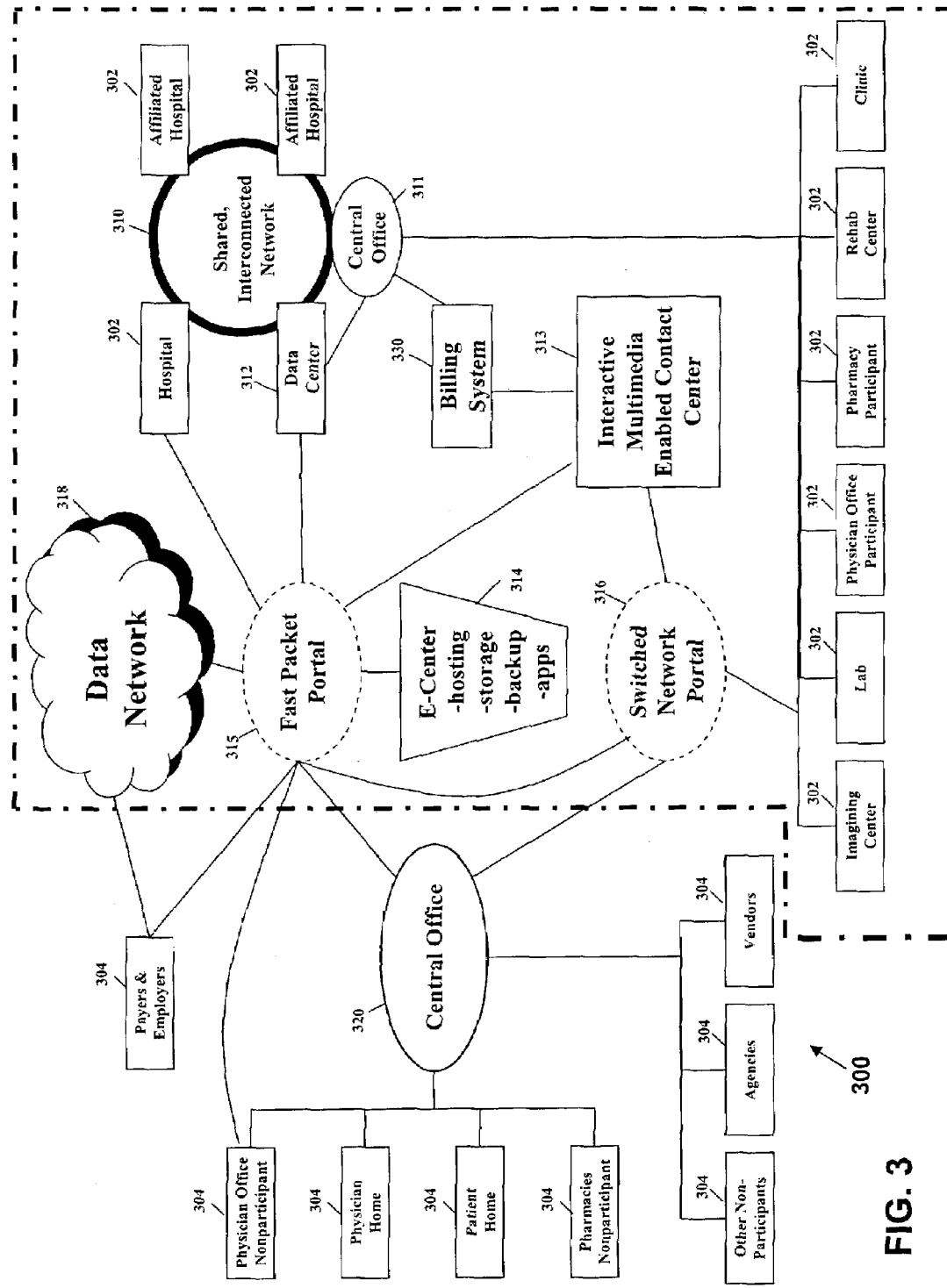
FIG. 3 is a schematic showing a detailed schematic of an operating environment for a healthcare VPN system according to an embodiment of this invention.

FIG. 7 illustrates a healthcare VPN 700 similar to the healthcare VPN 300 of FIG. 3; however, healthcare VPN 700 illustrates specific communications devices of the non-participant 130. Healthcare VPN 700 includes alternate communications devices of a non-participant that include a personal digital assistant (PDA) 702, a mobile phone 704 (e.g., cellular, satellite, Internet Protocol), a modem 706, an interactive pager 708, a global positioning system (GPS) transceiver 710, an MP3 player 712, a digital signal processor (DSP) 714, and an interactive television 716. These alternate communications devices communicate via an antenna 720 communicating with an MTSO 730 that transmits the electronic healthcare communication 410 to the switch 430. The Healthcare VPN 700 could also include a computer system 718. Whether the communications devices 304 or the computer system 718 is used, switch 430 routes the electronic healthcare communication 410 to the shared, interconnected network 310. In addition, FIG. 7 illustrates that the computer systems of the legacy system 110 include a variety of communications devices including computer system 200 and wireless communications devices, such as PDA 702. Regardless of the communications device used to send the electronic healthcare communication 410, the electronic healthcare communication 410 may need to be formatted accordingly for the receiving communications device (including audio, text (e.g., ASCII), video, other digital formats, and combination thereof). Thus, the VPN Rule-Based Application DataServer 448 has the intelligence to associate the presentation capabilities of the alternate communications device (associated with participants and non-participants).

FIG. 8 illustrates a healthcare VPN 800 similar to the healthcare VPN 700 disclosed in FIG. 7; however, healthcare VPN 800 includes a communications device gateway 810 connected with a data network 820 and a communications server 830 so that the electronic healthcare communication 410 communicated to/from switch 430 may be appropriately formatted for presentation on alternate communications devices 702-716. For example, if the alternate communications device uses the Wireless Application Protocol (WAP) technique, then the electronic healthcare communication (including transaction replies and/or notifications) 410 is communicated to the communications ("Comm") server 830. The electronic healthcare communications server 830 formats the electronic healthcare communication 410 into one or more Wireless Mark-up Language (WML) messages that are communicated over the data network 820 to the communications device gateway 810. The communications device gateway 810 then interfaces with the MTSO 730, and the MTSO 730 then wirelessly communicates the electronic healthcare communication 410 to the communications devices 304. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), and other signaling means.

Figure 9:
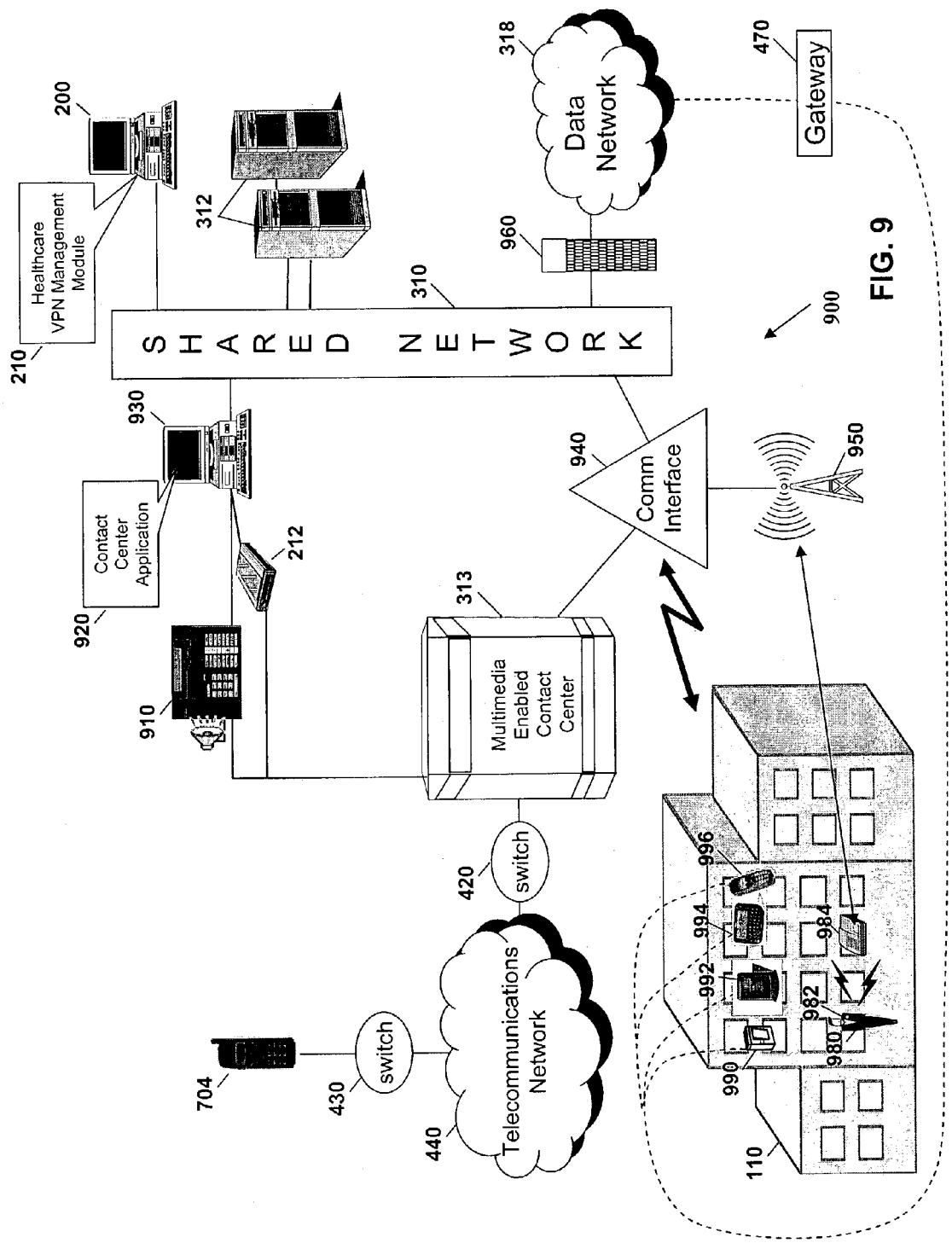
FIG. 9 is a schematic showing an exemplary operating environment for a healthcare VPN that includes means for determining a status of a designated party of a legacy system and communicating the electronic healthcare communication with the designated party through an internal communications interface or a data network gateway to a communications device according to an embodiment of this invention.
Figure 10:
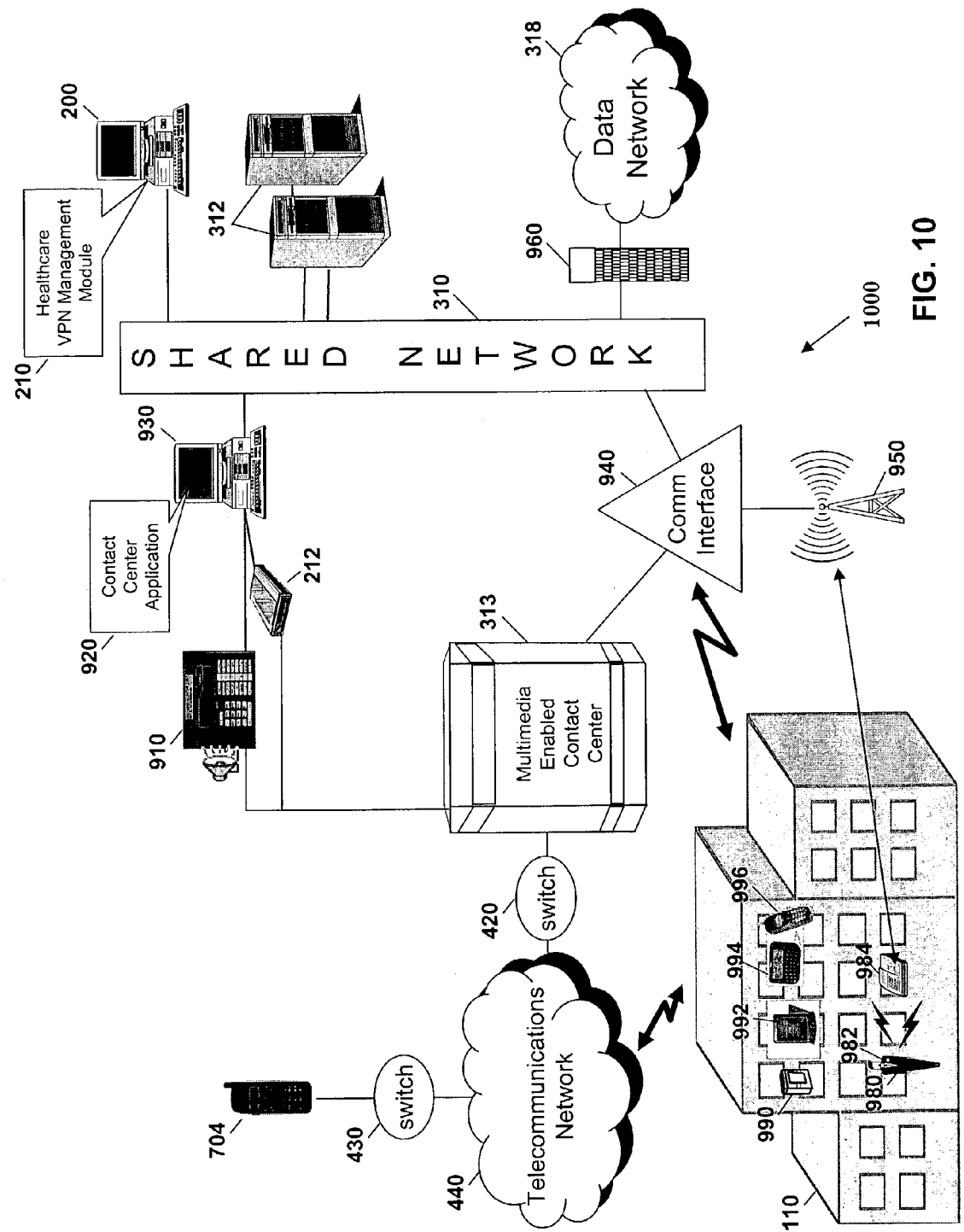
FIG. 10 is a schematic showing an exemplary operating environment for a healthcare VPN that includes means for determining a status of a designated party of a legacy system and communicating the electronic healthcare communication with the designated party through an internal communications interface or a telecommunications network to a communications device according to another embodiment of this invention.
Figure 11:
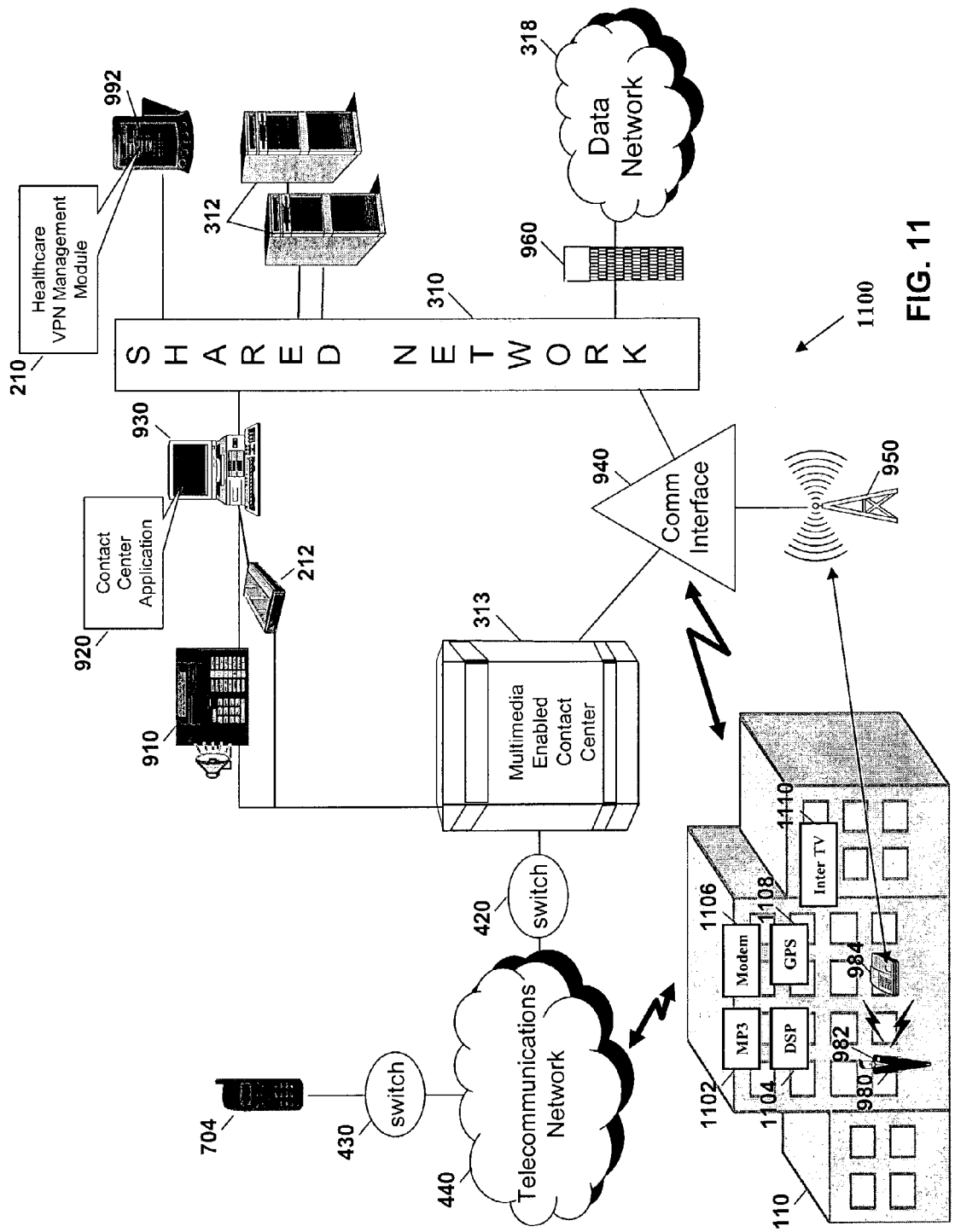
FIG. 11 is a schematic showing an exemplary operating environment for a healthcare VPN that includes means for determining a status of a designated party of a legacy system and communicating the electronic healthcare communication with the designated party through an internal communications interface or a telecommunications network to alternate communications device according to another embodiment of this invention.

FIGS. 9-11 illustrate an exemplary operating environment for a healthcare VPN that includes and makes use of the interactive multimedia enabled contact center 313 (hereinafter referred to as the "contact center"). The healthcare VPN 900 of FIG. 9 includes IP/cellular/mobile phone 704, switch 430, telecommunications network 440, switch 420, multimedia enable contact center 313, a telephone/voice workstation 910, a modem 912, at least one agent station 930, a contact center application 930, wide area network 310, computer system 200, healthcare VPN Management Module 210, at least one file server 312, a firewall 960, data network 318, a communications interface 940, an antenna 950, a gateway 970, participant 110, a designated party 980, a personal identification transmitter device 982, an intercom station 984, a pager 990, a PDA 992, an on-site, interactive pager 994, and a mobile phone 996. Typically, non-participant 130 uses phone 704 (or an alternate communications device including wired and wireless communications devices) to place a call routed through switch 430, telecommunication network 440, and switch 420 to the contact center 313. The electronic healthcare communication (e.g., incoming call) is usually detected by an interactive response system that provides intelligent routing of the call. For example, the non-participant may hear a prerecorded message prompting the non-participant to make an initial routing selection, such as, for example "Press 1 to register for classes," "Press 2 to speak with an agent operator," "Press 3 for directions," "If you know the extension of the party (i.e., the designated party), please press * and the party's four digit extension," and so on. Thus, the electronic healthcare communication may be initially routed to an appropriate agent or to the extension of the designated party 980 (the designated party includes a staff member, guest, or other individual affiliated with the legacy system 110). If the electronic healthcare communication is routed to the agent, then the call may be sent to the telephone/voice workstation 910 and/or through modem 912 to agent station 930. Further, the electronic healthcare communication and initial routing instructions provide information about the call to the telephone/voice workstation 910 and/or the agent station 900. For example, if the calling telephone number of the electronic healthcare communication is decoded and/or if the non-participant provides a calling telephone number or another identifier, such as a social security number or an account number, in response to an inquiry from the automated answering system (or if the identifier is associated with other information like the ICLID signal of the calling number of the phone 704), then when the agent station 930 receives the electronic healthcare communication, the contact center application 920 may automatically associate, retrieve, and pull up associated information (associated using responses to the interactive response system and/or ICLID signal) and/or a healthcare VPN communications profile 600 with the incoming call. After the agent answers the incoming call, the agent may gather additional information from the non-participant, associate other data to access the healthcare VPN communications profile 600, identify the designated party 980 who can further handle the non-participant's needs, determine a status of the designated party 980, and based upon an available status, transfer the electronic healthcare communication and associated data to an appropriate communications device, such as the workstation intercom 984 via communications interface 940 and antenna 950 or to alternate communications devices 990, 992, 994, and 996 via firewall 960, data network 318, and gateway 970. If the status is unavailable, then the agent may alternatively route the electronic healthcare communication and/or associated data to a messaging system, such as voicemail or pager number messaging. The operations of the multimedia contact center are further discuss in applicants' co-pending U.S. patent application Ser. No. 10/335,453 entitled "Computer Telephony Integration (CTI) Complete Healthcare Contact Center," filed Dec. 31, 2002, and of which the "Brief Summary of the Invention" and "Detailed Description of the Invention" sections are incorporated herein by this reference.

FIG. 10 illustrates a healthcare VPN 1000 similar to the healthcare VPN 900 of FIG. 9; however, the electronic healthcare communication, associated data, transaction reply, and/or transaction notification are routed through the telecommunications network 440. An advantage of using the telecommunications network 440 may be to leverage the assets of other affiliated data, up-to-date formatting and configuration programs (including sharing the costs of these systems with other customers of the telecommunications network), and increased range of accessing off-site staff (e.g., when a staff member is not located on the premises of the participant 110, the transmitter 982 and/or alternate communications devices, such as the phone 996, could provide the means to determine the location, and consequently the status, of the designated party 980).

FIG. 11 illustrates a healthcare VPN 1100 similar to healthcare VPN 1000 of FIG. 10; however, healthcare VPN 1100 further includes a MP3 1102, a digital signal processor 1104, a modem 1106, a global positioning system (GPS) 1108, and interactive television 1110. According to this embodiment, the agent receives the electronic healthcare communication and any associated data at his/her station 930, interacts with the non-participant to identify the designated party 980, determines the status of the designated party 980 (when status is activated), associates the status with the electronic healthcare communications profile 600 to select one or more of the communications devices (including the intercom station 984, the MP3 1102, the digital signal processor 1104, the modem 1106, the global positioning system (GPS) 1108, and the interactive television 1110) to communicate with, and provides the electronic healthcare communication and/or associated data to a selected communications devices. As discussed above, the communications interface 440 and/or the telecommunications network 440 ensures that the electronic healthcare communication, associated data, and/or responses (including transaction replies and/or transaction notifications) are formatted and/or otherwise configured for each of the selected communications devices. Alternatively, the electronic healthcare communication, associated data, and/or responses of the healthcare VPN 1100 may be routed through firewall 960 to the data network 318 and a gateway (not shown) to each of the selected communications devices.

Figure 12:
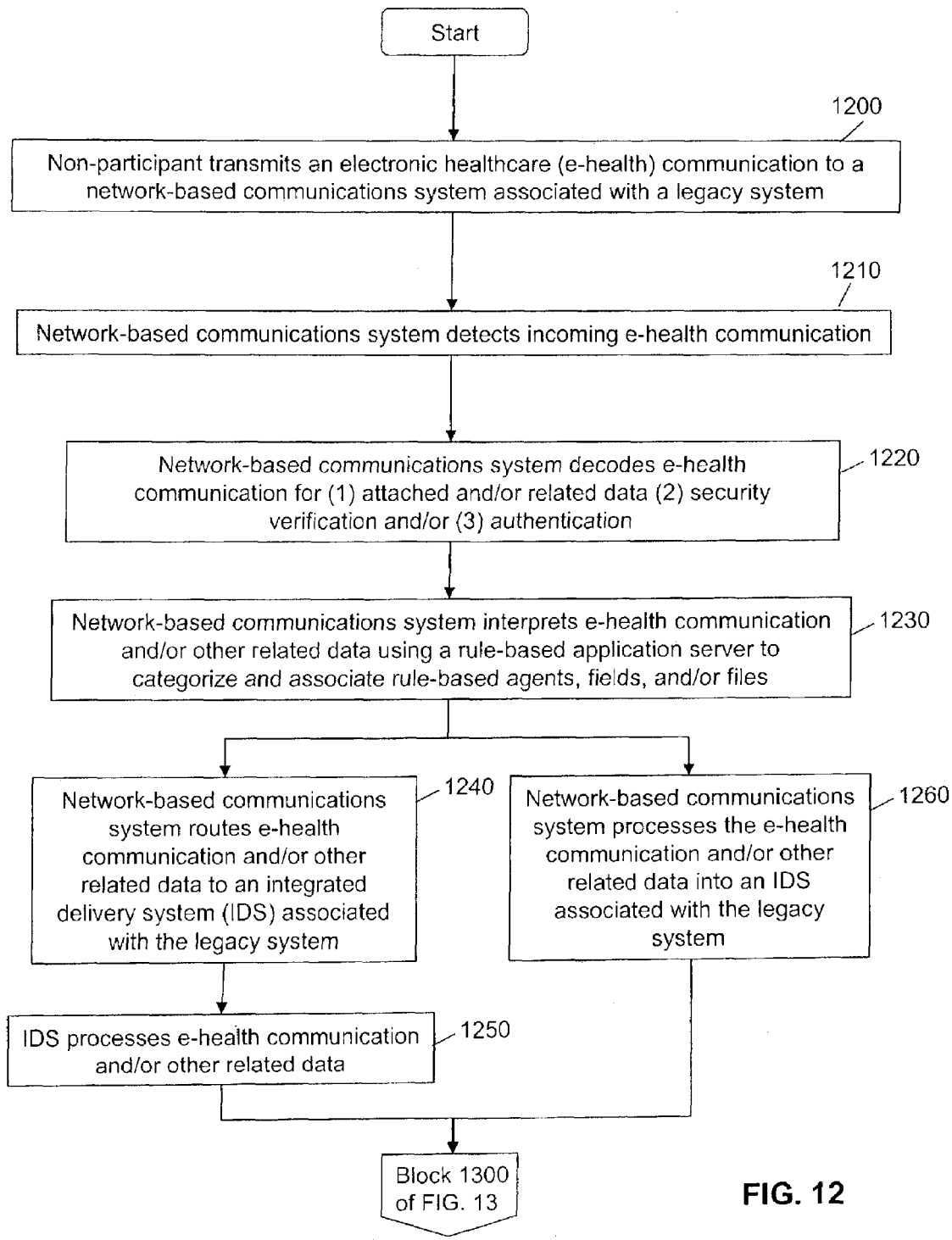
FIGS. 12-13 are flowcharts showing a method of providing healthcare VPN services to a participant and a non-participant according to an embodiment of this invention.
Figure 13:
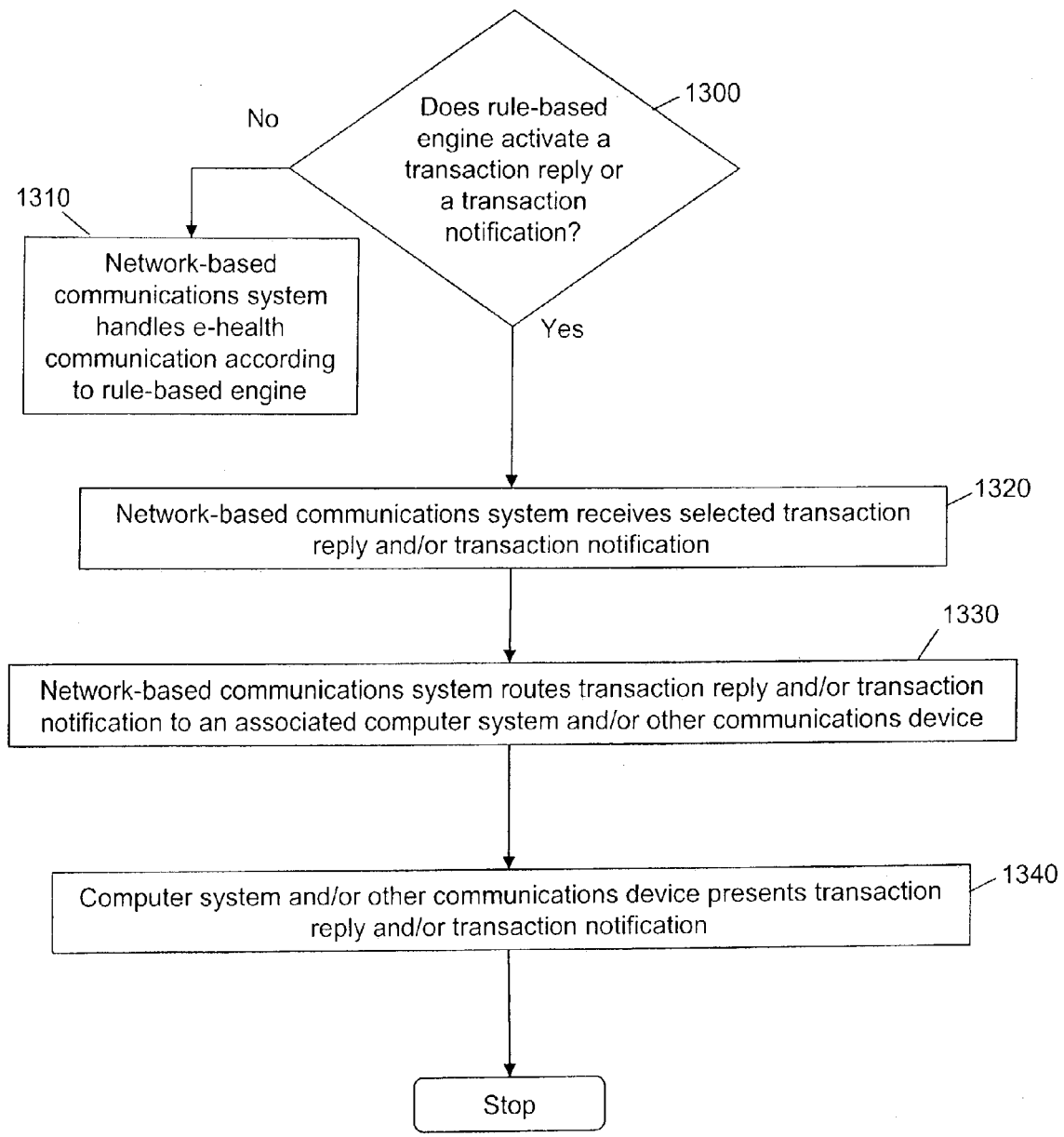
Figure 14:
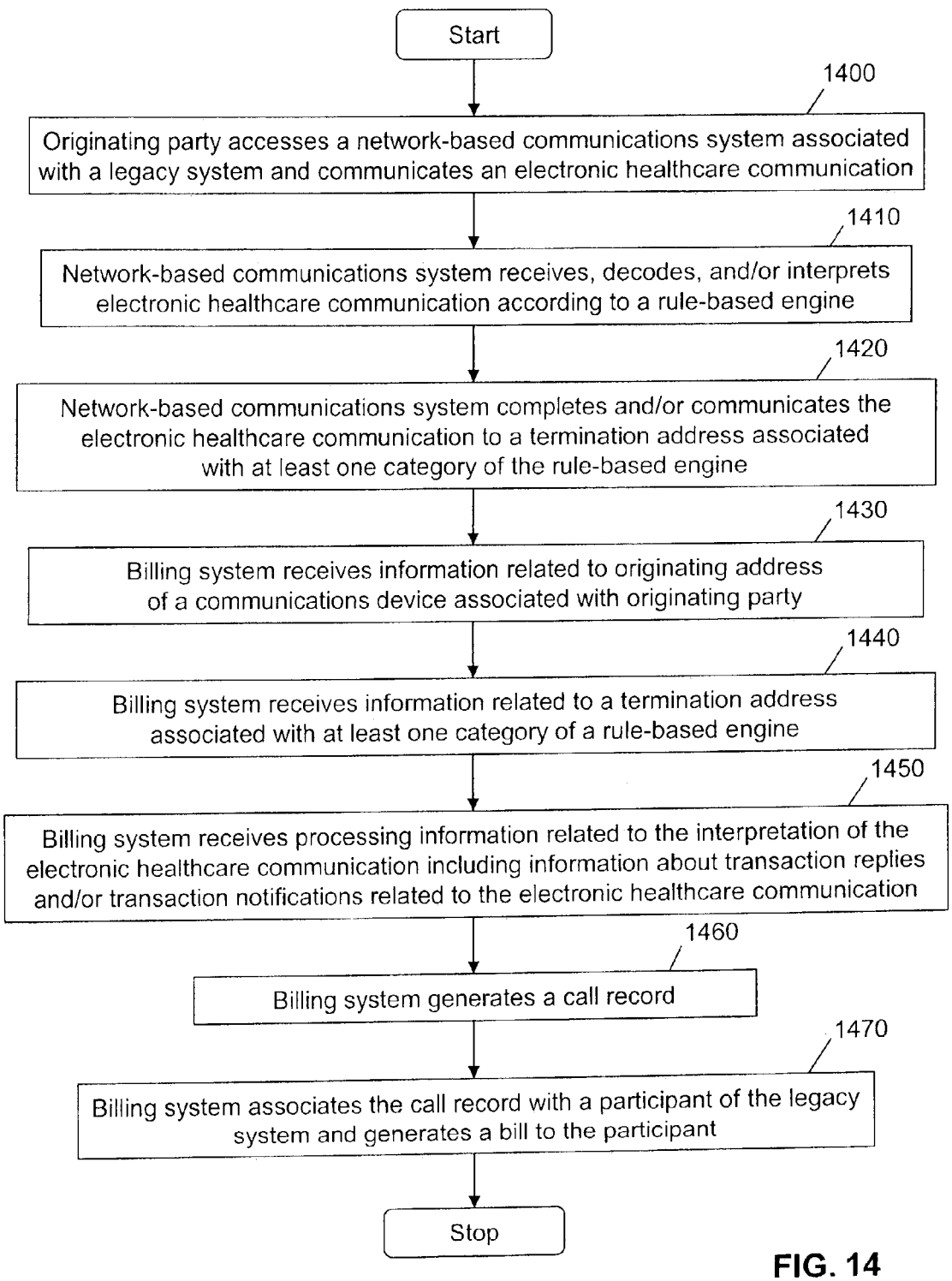
FIG. 14 is a flowchart showing a method of billing for healthcare VPN services according to an embodiment of this invention.

FIGS. 12-13 illustrate a flowchart showing a process of providing the healthcare virtual private network service according to an embodiment of this invention. FIG. 14 illustrates a flowchart showing a method of billing for healthcare VPN services according to an embodiment of this invention. While the process in FIGS. 12-14 are shown in series, these processes may occur in different orders and/or at simultaneous times as one of ordinary skill in the art will understand.

Referring now to FIG. 12, a non-participant transmits an electronic healthcare communication (via a communications device) to a network-based communications system associated with the legacy system (block 1200). The network-based communications system detects the incoming electronic healthcare communication from the communications device of the non-participant (block 1210). The network-based communications system decodes the incoming electronic healthcare communication for (1) an attached file and/or other related electronic healthcare data (e.g., queried data from an external data source, a linked file, data that is cut and pasted into the body of an email, etc.), (2) security verification, and (3) authentication (e.g., data and/or participants may be authenticated) (block 1220). Next, the network-based communications system interprets the attached file and/or other related electronic healthcare data using a rule-based application server to categorize and associate rule based agents, fields, and/or files (block 1230). The attached file and/or other related electronic healthcare data is then processed according to how an integrated delivery system (IDS) is configured (e.g., integrated into the network-based communications system or accessed separate from the network-based communications system). If the integrated delivery system is not integrated with the network-based communications system (e.g., the integrated delivery system is accessed separate from the network-based communications system), then the network-based communications system routes the attached file and/or other related electronic healthcare data to the integrated delivery system associated with the legacy system (block 1240), and the integrated delivery system processes the attached file and/or other related electronic healthcare data so that the attached file and/or other related electronic healthcare data can be exchanged with the legacy system (block 1250). If the integrated delivery system is integrated with the network-based communications system, then the network-based communications system processes the attached file and/or other related electronic healthcare data into the integrated delivery system so that the attached file and/or related electronic healthcare data can be exchanged with the legacy system (block 1260). By allowing both IDS architects, VPN Management Services may be dynamically implemented across different platforms.

The method then continues with block 1300 of FIG. 13. The rule based engine determines whether to activate a transaction reply and/or a transaction notification (block 1300). If there is no transaction reply and/or no transaction notification, then the network-based communications system handles the electronic healthcare communication and/or other related electronic healthcare data according to instructions from the rule-based engine (block 1310). Alternatively, if a transaction replay and/or transaction notification is activated, then the network-based communications system selects the appropriate transaction reply and/or transaction notification (block 1320), routes the transaction reply and/or transaction notification to a computer system or other communications device (block 1330), and a client application (e.g., VPN Management Module 210, applet, web browser) residing on the computer system or accessible by other communications device presents the transaction reply and/or transaction notification (block 1340).

Referring now to FIG. 14, an originating party (e.g., non-participant 130 or participant 110) accesses a network-based communications system associated with a legacy system and communicates an electronic healthcare message (step 1400). The network-based communications system receives, decodes, and/or interprets the electronic healthcare communication according to a rule-based engine as discussed above (step 1410). The network-based communications system completes and/or otherwise communicates the electronic healthcare communication to a termination address associated with at least one of the categories of the rule-based engine (the termination address is typically stored and/or otherwise associated by a rule-based profile (e.g., healthcare VPN rule-based profile 500 of FIG. 5) of a rule-based dataserver (e.g., healthcare VPN rule-based application dataserver 448 of FIG. 4) that uses the rule-based engine) (step 1420). Thereafter, a billing system (e.g., billing system 330 of FIG. 3) receives information related to the originating address of a communications device (e.g., reference numerals 702-718 of FIG. 7) associated with the originating party (e.g., non-participant 130 of FIG. 1) (step 1430). The billing system also receives information related to a termination address associated with at least one of the categories of the rule-based engine (step 1440) and receives processing information related to the interpretation of the electronic healthcare communication (step 1450). Next, the billing system generates a call record (step 1460). The call record includes information such as geographic locations of the originating address and termination address (that may be used to determine local, long distance, and/or toll fees), minutes of use (e.g., minutes related to transmission and/or routing of the electronic healthcare communication), routing systems (e.g., PBX equipment), features, trouble shooting, and/or other billing information. Finally, the billing system associates one or more call records with a participant of the legacy system and generates a bill to the participant (step 1470). Many billing systems are known in the art, such as U.S. patent application Ser. No. 09/498,684, entitled "Billing and Routing Local Toll-Free Calls," filed Feb. 7, 2000, and this invention makes use of similar systems, but further includes healthcare VPN DataServer 448 for call processing and routing as well as 3associated systems, such as e-center 314.

While several exemplary implementations of embodiments of this invention are described herein, various modifications and alternate embodiments will occur to those of ordinary skill in the art. Accordingly, this invention is intended to include those other variations, modifications, and alternate embodiments that adhere to the spirit and scope of this invention.

What is claimed is:

1. A method, comprising:
   receiving an electronic healthcare communication to a communications system, the electronic healthcare communication associated with at least one legacy system;
   categorizing the electronic healthcare communication as at least one of (1) data associated with an access agent, (2) data associated with a security agent, (3) data associated a messaging/communications agent, (4) data associated with a transactional agent, and (5) data associated with a troubleshooting agent; and
   processing the electronic healthcare communication within the at least one legacy system according to the category;
   selecting a transaction reply for delivery to a sender communication device associated with a non-participant communication device when the categorization applies a sender rule; and
   routing the transaction reply to the non-participant communication device,
   wherein the communications system enables an exchange of at least one of the electronic healthcare communication and selected data between one or more networks of communications devices.

2. The method of claim 1, further comprising:
   selecting a transaction notification for delivery to a receiver communication device associated with the legacy system when the categorization applies a receiver notification rule; and
   routing the transaction notification to the receiver communications device.

3. The method of claim 1, wherein categorizing the electronic healthcare communication further comprises:
   accessing at least one rule-based application dataserver associated with a communications network, the rule-based application dataserver providing a rule-based engine to interpret the electronic healthcare communication; and
   utilizing the rule-based application dataserver to categorize the electronic healthcare communication.

4. The method of claim 3, wherein the rule-based application dataserver comprises an application server having at least one of an access agent, a security agent, a messaging/communications agent, a transactional agent, and a troubleshooting agent.

5. The method of claim 4, wherein categorizing the electronic healthcare communication using the rule-based engine comprises:
   verifying the electronic healthcare communication meets authenticity requirements of the at least one legacy system; and
   verifying the electronic healthcare communication meets security requirements of the at least one legacy system.

6. The method of claim 3, further comprising:
   managing the rule-based application dataserver associated with the communications network to control access to the at least one legacy system.

7. The method of claim 1, wherein processing the electronic healthcare communication within the at least one legacy system comprises:
   converting the electronic healthcare communication from a first data format associated with the non-participant communications device to a compatible second data format associated with the at least one legacy system.

8. The method of claim 7, wherein the first data format is one of a printed text format, a voice data format, a video data format, a dual tone multi-frequency data format, and a digital data format.

9. The method of claim 8, wherein the second data format is one of a printed text format, a voice data format, a video data format, a dual tone multi-frequency data format, and a digital data format.

10. The method of claim 9, wherein the digital data format is ASCII.

11. The method of claim 7, wherein processing the electronic healthcare communication within the at least one legacy system further comprises at least one of (i) sending the compatible second data format to a storage device associated with a communications service provider, (ii) archiving the compatible second data format, (iii) encrypting the compatible second data format, (iv) copying the compatible second data format, and (v) associating the compatible second data format with related data in the receiver legacy system.

12. The method of claim 11, wherein processing the electronic healthcare communication within the at least one legacy system further comprises communicating the compatible second data format to an Internet Protocol address of the one or more communications devices, the communications devices comprising at least one of the following:
   a wireless communications device,
   a mobile phone,
   a cellular phone,
   a WAP phone,
   a satellite phone
   a computer,
   a modem,
   a pager,
   a digital music device, a digital recording device,
a personal digital assistant,
an interactive television,
a digital signal processor, and
a Global Positioning System device.

13. The method of claim 12, wherein communicating the compatible second data format comprises communicating the compatible second data format via at least one of the following:
an analog line;
a Digital Subscriber Line (DSL);
an Integrated Services Digital Network (ISDN) line;
an ATM Sonet;
a SmartRing service line;
a Frame Relay service line; and
a local loop of a telecommunications network.

14. The method of claim 12, wherein communicating the compatible second data format comprises communicating the compatible second data format via means for optically transmitting data.

15. The method of claim 12, wherein communicating the compatible second data format comprises communicating the compatible second data format via wireless transmission.

16. The method of claim 1, wherein categorizing the electronic healthcare communication comprises accessing at least one rule-based application dataserver associated with a telecommunications facility, the telecommunications facility comprising at least one of telephone switching equipment and mobile telephone switching equipment.

17. A method, comprising:
establishing a first data connection between a communications device and a communications system;
establishing a second data connection between a legacy system and the communications system, the second data connection using a rule-based application dataserver hosted by a service provider to control access to and from the legacy system, the rule-based application dataserver comprising rules for categorizing electronic healthcare data according to the following: (1) data associated with an access agent, (2) data associated with a security agent, (3) data associated a messaging/communications agent, (4) data associated with a transactional agent, and (5) data associated with a troubleshooting agent;
communicating the electronic healthcare data via the first data connection and the second data connection, wherein a communication address of the first data connection is detected and decoded to route the electronic healthcare data;
selecting a transaction reply for delivery to a sender communication device associated with a network of non-participant communications devices when the categorization applies a sender reply rule; and
routing the transaction reply to a non-participant communications device.

18. The method of claim 17, further comprising allowing a user to manage a rule-based engine associated with the rule-based application dataserver.

19. A method of billing for an electronic healthcare communication, comprising:
receiving information related to an originating address of an electronic healthcare communication to a communications system, the electronic healthcare communication associated with at least one legacy system;
receiving information related to a termination address, the termination address determined by selecting a category of the electronic healthcare communication comprising (1) data associated with an access agent, (2) data associated with a security agent, (3) data associated a messaging/communications agent, (4) data associated with a transactional agent, and (5) data associated with a troubleshooting agent;
transmitting the originating address information to a billing element of the communications system;
transmitting the termination address to the billing element of the communications system;
communicating the electronic healthcare communication to the termination address;
transmitting categorization information to the billing element of the communications system, the categorization information describing the selected category for the electronic healthcare communication;
transmitting a call record to a billing database; and
billing a participant for communicating the electronic healthcare communication to the termination address.

20. The method of claim 19, wherein the call record contains information for the electronic healthcare communication comprising at least one of geographic information, minutes of use, method of routing the electronic healthcare communication, call features, and troubleshooting information.

21. The method of claim 19 wherein the originating number further comprises a portable telephone number.

22. A storage media on which is encoded instructions for performing a method, the method comprising:
receiving an electronic healthcare communication to a communications system, the electronic healthcare communication associated with at least one legacy system, wherein the communications system enables an exchange of at least one of the electronic healthcare communication and selected data between one or more networks of communications devices associated with at least one telecommunications service provider,
categorizing the electronic healthcare communication as at least one of (1) data associated with an access agent, (2) data associated with a security agent, (3) data associated with a messaging/communications agent, (4) data associated with a transactional agent, and (5) data associated with a troubleshooting agent, wherein the data associated with the messaging/communications agent comprises a communications address of the electronic healthcare communication, the communications address for muting the electronic healthcare communication;
processing the electronic healthcare communication within the at least one legacy system according to the category;
selecting a transaction reply for delivery to a sender communication device associated with a network of non-participant communication devices when the categorization applies a sender rule; and
routing the transaction reply to a non-participant communication device.

* * * * *